(12) United States Patent
Yin et al.

(10) Patent No.: US 11,823,350 B2
(45) Date of Patent: Nov. 21, 2023

(54) IMAGE/VIDEO PROCESSING

(71) Applicant: Lemon Inc.

(72) Inventors: Wenbin Yin, Beijing (CN); Haibin Yin, Beijing (CN); Li Zhang, Los Angeles, CA (US); Huade Shi, Beijing (CN)

(73) Assignee: LEMON INC., Grand Cayman (KY)

( * ) Notice: Subject to any disclaimer, the term of this patent is extended or adjusted under 35 U.S.C. 154(b) by 161 days.

(21) Appl. No.: 17/157,694

(22) Filed: Jan. 25, 2021

(65) Prior Publication Data
US 2022/0237741 A1    Jul. 28, 2022

(51) Int. Cl.
| | |
|---|---|
| *H04N 19/117* | (2014.01) |
| *G06T 3/40* | (2006.01) |
| *G06T 9/00* | (2006.01) |
| *G06T 5/00* | (2006.01) |
| *H04N 19/176* | (2014.01) |
| *H04N 19/33* | (2014.01) |
| *H04N 19/46* | (2014.01) |
| *G06T 5/50* | (2006.01) |

(52) U.S. Cl.
CPC ............ *G06T 3/4053* (2013.01); *G06T 5/002* (2013.01); *G06T 5/50* (2013.01); *G06T 9/00* (2013.01); *H04N 19/117* (2014.11); *H04N 19/176* (2014.11); *H04N 19/33* (2014.11); *H04N 19/46* (2014.11)

(58) Field of Classification Search
CPC ............ H03M 1/1009; H03M 1/1061; H03M 1/1215; H03M 1/0626; H03M 1/1038; H03M 1/1057; H03M 1/125; H03M 1/34; H03M 13/27; G06T 3/4053; G06T 5/002; G06T 5/50; G06T 9/00; H04N 19/117; H04N 19/176; H04N 19/33; H04N 19/46
See application file for complete search history.

(56) References Cited

U.S. PATENT DOCUMENTS

| | | | |
|---|---|---|---|
| 2013/0216119 A1* | 8/2013 | Baumgart | A61B 5/14 382/134 |
| 2020/0090305 A1* | 3/2020 | El-Khamy | G06T 3/4053 |
| 2020/0193566 A1* | 6/2020 | Croxford | G06N 3/08 |
| 2020/0358927 A1* | 11/2020 | Tanaka | H04N 1/00037 |
| 2021/0374908 A1* | 12/2021 | Lin | G06N 20/00 |

FOREIGN PATENT DOCUMENTS

| | | | | |
|---|---|---|---|---|
| CN | 108765343 A | * | 11/2018 | ........... G06T 3/4053 |
| JP | 2004147352 A | * | 5/2004 | ........... H04N 11/044 |
| JP | 2013114510 A | * | 6/2013 | |

* cited by examiner

*Primary Examiner* — Md N Haque
(74) *Attorney, Agent, or Firm* — ARENTFOX SCHIFF LLP

(57) ABSTRACT

Implementations of the present disclosure provide a solution for image/video processing. In this solution, an intermediate image can be obtained from an LR image. Then, a smooth value associated with an image block in the intermediate image could be determined based on a gradient of a target pixel in the image block. Further, an HR image can be generated from the intermediate image based on the smooth value. In this way, the filtering process can be performed based on a smooth value of an image block, thereby improving the efficiency of image/video processing and lowering down the computational and memory costs.

16 Claims, 7 Drawing Sheets

IMAGE/VIDEO PROCESSING

FIELD

Embodiments of the present disclosure relates generally to computer technology, and more particularly, to image/video processing.

BACKGROUND

Image super-resolution refers to a process of estimating a high-resolution image from a low-resolution input image. By increasing the resolution of an image, super-resolution technology can improve the quality of the image and thus can provide an image with a clearer appearance or facilitate subsequent image processing tasks such as image analysis.

With the development of computer technology, Single Image Super Resolution (SISR) has been widely used. The input image could be treated as measurements of high-resolution image and the goal of SISR is to recover the unknown pixels from these known measurements. However, SISR and other known processes for image super-resolution usually require high computational and/or memory costs.

SUMMARY

Embodiments of the present disclosure provide a solution for image/video processing.

In a first aspect, a method for image processing is provided. The method comprises: obtaining an intermediate image from a first image, wherein the intermediate image has a higher resolution than the first image; determining a smooth value associated with an image block in the intermediate image based on a gradient of a target pixel in the image block; and generating a second image from the intermediate image based on the smooth value, wherein the second image has a higher resolution than the first image.

In some embodiments, the method further comprises: determining mask information based on the smooth value, wherein the mask information at least indicating whether the image block is to be filtered.

In some embodiments, the mask information indicating that the image block is not to be filtered in a case that the smooth value is greater than a first threshold.

In some embodiments, the mask information indicating that the image block is to be filtered in a case that the smooth value is less than or equal to a second threshold.

In some embodiments, generating the second image comprises: generating the second image based on the image block without filtering in a case that the smooth value is greater than a threshold.

In some embodiments, generating the second image comprises: generating the second image based on the image block with filtering in a case that the smooth value is less than or equal to a threshold.

In some embodiments, generating the second image from the intermediate image comprises: selecting a target filter from a target group of trained filters; filtering the image block based on the target filter to obtain a filtered image block; and generating the second image based on the filtered image block.

In some embodiments, selecting a target filter from a group of trained filters, comprises: determining a filter key associated with the image block based on a horizontal gradient and a vertical gradient of a pixel in the image block, wherein the filter key is irrelevant to a product of the horizontal gradient and the vertical gradient; and selecting the target filter from the target group of trained filters based on the filter key, each of the target group of trained filters associated with a corresponding filter key.

In some embodiments, determining a filter key associated with the image block based on a horizontal gradient and a vertical gradient of a pixel in the image block comprise: determining the filter key by the following functions:

$$S = \frac{0.99}{g_x + g_y + e^{-4}}$$

$$T = S \times g_x$$

$$M = g_{xy} \times S + 0.49$$

$$\text{key} = \lfloor \theta \times T \rfloor \times \mu + \lfloor M \times \mu \rfloor$$

wherein, $g_x$ is the horizontal gradient, $g_y$ is the vertical gradient, $g_{xy} = g_x \times g_y$, $\theta$ and $\mu$ are predefined parameters.

In some embodiments, the method comprises: determining an up-scale ratio for the first image; and selecting the target group of trained filters from multiple groups of trained filters, wherein the target group of trained filters are trained with a training up-scale ratio matching the determined up-scale ratio, and wherein each group of the multiple groups of trained filters comprises multiple trained filters.

In some embodiments, the up-scale ratio for the first image is K, wherein a group of the multiple groups of trained filters is trained with an up-scale ratio $k_i$, wherein i is an integer greater than 0 and less than N+1, wherein the multiple groups of trained filters are sorted by the trained up-scale ratio $k_i$, ascending, and wherein N denotes the number of the multiple groups, wherein the i-th group of trained filters is selected as the target group if:

$$\begin{cases} 0 < K < \dfrac{1}{k_i + a}, & i = 1 \\ \dfrac{1}{k_i + a} \leq K < \dfrac{1}{k_i - a}, & 1 < i < N, \\ K \geq \dfrac{1}{k_i + a}, & i = N \end{cases}$$

wherein a is a constant.

In some embodiments, each filter of the multiple trained filters is trained with screen content images.

In some embodiments, each filter of the multiple trained filters is trained with both natural images and screen content images, and a number of the natural images is less than a number of the screen content images.

In some embodiments, the up-scale ratio comprises a horizontal up-scale ratio and a vertical up-scale ratio different from the horizontal up-scale ratio, and wherein selecting the target group of trained filters from multiple groups of trained filters comprises: selecting, from multiple groups of trained filters, a first group of trained filters based on the horizontal up-scale ratio, wherein each filter of the first group of trained filters is used for filtering in a horizontal direction; and selecting, from the multiple groups of trained filters, a second group of trained filters based on the vertical up-scale ratio, wherein each filter of the second group of filters is used for filtering in a vertical direction.

In some embodiments, filtering the image block using the target filter comprises: filtering the image block by using a first target filter selected from the first group of trained filters in a horizontal direction; and filtering the filtered image block by using a second target filter selected from the second group of trained filters in a vertical direction.

In some embodiments, the image block is a first image block, and generating the second image based on the image block with filtering comprises: filtering the first image block to obtain a second image block; blending the first image block and the second image block to obtain a third image block in a case that a difference between a pixel in the first image block and a corresponding second pixel in the second image block is greater than a threshold; generating the second image based on the third image block.

In some embodiments, the target group of trained filters are trained using Singular Value Decomposition.

In some embodiments, gradients' angle is disregarded during training of the target group of trained filters.

In some embodiments, the target filter comprises at least one of: a filer with a square shape, a filter with a symmetric shape, or a filter with an asymmetric shape.

In some embodiments, the filer with a square shape is a filer with 7×7 square or 11×11 square.

In some embodiments, the gradient of the target pixel is derived based on the target pixel and at least one of: a pixel which is horizontally adjacent with the target pixel, a pixel which is vertically adjacent with the target pixel, or a pixel which is diagonally adjacent with the target pixel.

In some embodiments, the smooth value is derived based on a gradient of a target pixel in the image block, and wherein the target pixel comprises one or more pixels selected from a plurality of pixels of the image block.

In some embodiments, the first image is a first sub-image of a target image, the method further comprising: generating a third image based on a second sub-image of the target image in parallel with generating the second image based on the first image, wherein the third image has a higher resolution than the second sub-image.

In some embodiments, the first image is a first frame, and the first frame is a reference frame of a second frame, the method further comprising: obtaining a first flag from a bitstream, wherein the first flag indicates that an up-sampling process on the second frame is to be skipped; determining the second image as an output frame of the second frame.

In some embodiments, the first image is a first sub-image, and the first sub-image is a reference sub-frame of a second sub-frame, the method further comprising: obtaining a second flag from a bitstream, wherein the second flag indicates that an up-sampling process on the second sub-frame is to be skipped; determining the second image as an output frame of the second sub-frame.

In some embodiments, the method further comprises: determining the reference sub-image based on motion information of reuse information of the second sub-image, wherein the reuse information comprise at least one of: Motion Vector (MV), Block Vector (BV) or a reference frame of the second sub-image.

In some embodiments, the intermediate image is derived from the first image using a bicubic interpolation algorithm, a lanczos interpolation algorithm, or a nearest-neighbor interpolation algorithm.

In some embodiments, the method further comprises: encoding the first image into a bitstream of a video.

In some embodiments, the method further comprises: decoding the first image from a bitstream of a video.

In some embodiments, the gradient of the target pixel and a reference pixel adjacent with the target pixel, wherein the reference pixel is derived by padding boundary pixels of the intermediate image in a case that the reference pixel is out of the intermediate image.

In some embodiments, the gradient of the target pixel is derived based on at least two of: a horizontal gradient, derived based on the target pixel and a pixel which is horizontally adjacent with the target pixel, a vertical gradient, derived based on the target pixel and a pixel which is vertically adjacent with the target pixel, or a diagonal gradient, derived based on the target pixel and a pixel which is diagonally adjacent with the target pixel.

In some embodiments, the gradient of the target pixel is derived by using weighted average algorithm, and wherein weights in the weighted average algorithm can be same or different.

In a second aspect, an apparatus for processing image data is provided. The apparatus comprises a processor and a non-transitory memory with instructions thereon, wherein the instructions upon execution by the processor, cause the processor to: obtain an intermediate image from a first image, wherein the intermediate image has a higher resolution than the first image; determine a smooth value associated with an image block in the intermediate image based on a gradient of a target pixel in the image block; and generate a second image from the intermediate image based on the smooth value, wherein the second image has a higher resolution than the first image.

In a third aspect, a non-transitory computer-readable storage medium is provided. The non-transitory computer-readable storage medium store instructions that cause a processor to: obtain an intermediate image from a first image, wherein the intermediate image has a higher resolution than the first image; determine a smooth value associated with an image block in the intermediate image based on a gradient of a target pixel in the image block; and generate a second image from the intermediate image based on the smooth value, wherein the second image has a higher resolution than the first image.

In a fourth aspect, a non-transitory computer-readable recording medium is provided. The non-transitory computer-readable recording medium store a bitstream of a video which is generated by a method performed by a video processing apparatus, wherein the method comprises: obtaining, for conversion between a first image of a video and a bitstream of the video, an intermediate image from the first image, wherein the intermediate image has a higher resolution than the first image; determining a smooth value associated with an image block in the intermediate image based on a gradient of a target pixel in the image block; and generating a second image from the intermediate image based on the smooth value, wherein the second image has a higher resolution than the first image; and generating the bitstream from the first image.

In a fifth aspect, a method for image processing is provided. The method comprises: obtaining, for conversion between a first image of a video and a bitstream of the video, an intermediate image from the first image, wherein the intermediate image has a higher resolution than the first image; determining a smooth value associated with an image block in the intermediate image based on a gradient of a target pixel in the image block; and generating a second image from the intermediate image based on the smooth value, wherein the second image has a higher resolution than the first image.

In some embodiments, the conversion includes encoding the first image into the bitstream.

In some embodiments, the conversion includes decoding the first image from the bitstream.

According to the embodiments of the present disclosure, the filtering process can be performed based on a smooth degree of an image block, thereby improving the efficiency of image/video processing, and lowering down the computational and memory costs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION

Figure 1:
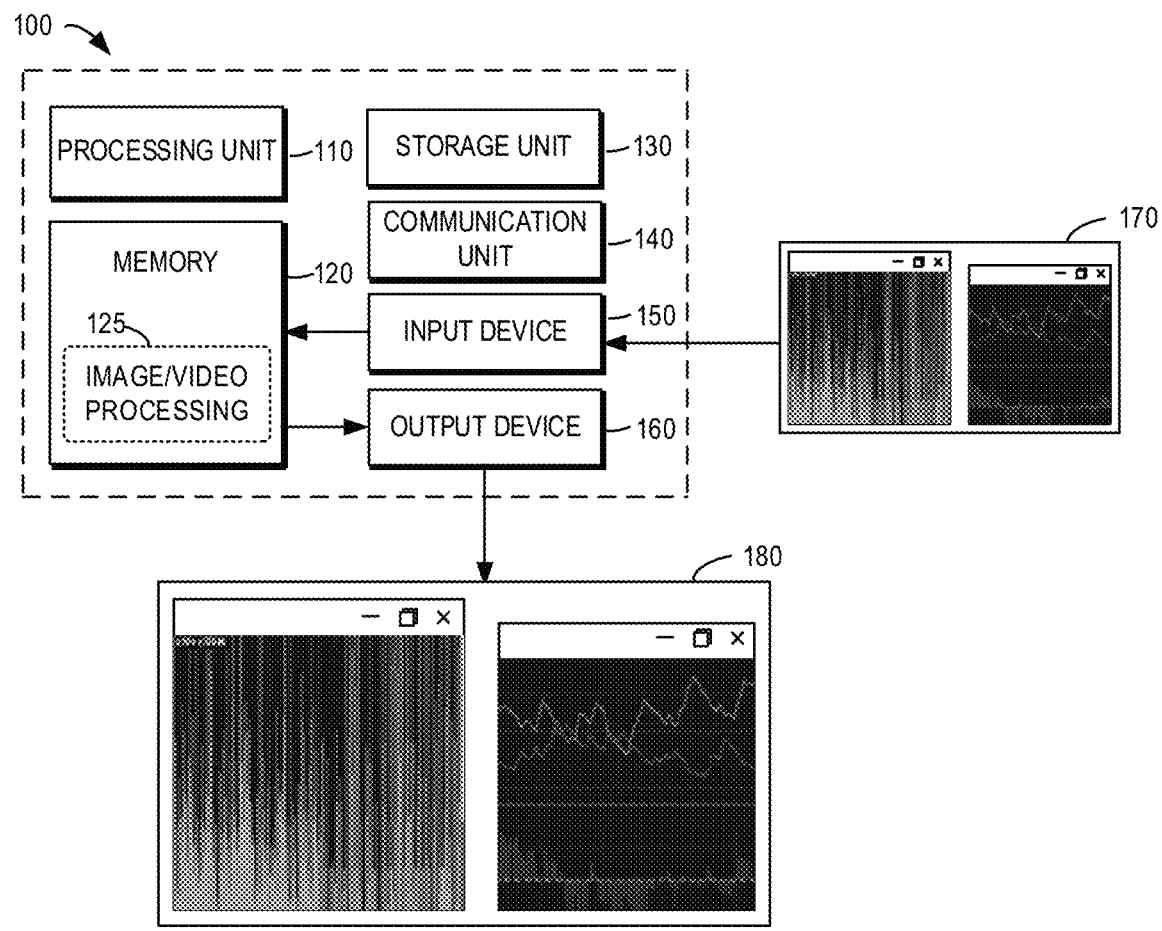
FIG. 1 illustrates a block diagram of a computing device in which various embodiments of the subject matter described herein can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Image super-resolution is now playing an important role in many applications, such as image inpainting, video conference, satellite image processing and the like. A super-resolution image may provide people with more details, which may help a lot either in automatically image processing or artificially processing. In embodiments of the subject matter described herein, there is provided a solution for image/video processing based on super-resolution.

FIG. 1 illustrates a block diagram of a computing device 100 in which various embodiments of the subject matter described herein can be implemented. It would be appreciated that the computing device 100 shown in FIG. 1 is merely for purpose of illustration, without suggesting any limitation to the functions and scopes of the embodiments of the subject matter described herein in any manner.

As shown in FIG. 1, the computing device 100 includes a general-purpose computing device 100. The computing device 100 may at least comprise one or more processors or processing units 110, a memory 120, a storage device 130, one or more communication units 140, one or more input devices 150, and one or more output devices 120.

In some embodiments, the computing device 100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processes based on programs stored in the memory 120. In a multi-processor system, multiple processing units execute computer executable instructions in parallel so as to improve the parallel processing capability of the computing device 100. The processing unit 110 may also be referred to as a central processing unit (CPU), a graphical processing unit (GPU), a microprocessor, a controller or a microcontroller.

The computing device 100 typically includes various computer storage medium. Such medium can be any medium accessible by the computing device 100, including, but not limited to, volatile and non-volatile medium, or detachable and non-detachable medium. The memory 120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 130 may be any detachable or non-detachable medium and may include a machine-readable medium such as a memory, flash memory drive, magnetic disk or another other media, which can be used for storing information and/or data and can be accessed in the computing device 100.

The computing device 100 may further include additional detachable/non-detachable, volatile/non-volatile memory medium. Although not shown in FIG. 1, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 140 communicates with a further computing device via the communication medium. In addition, the functions of the components in the computing device 100 can be implemented by a single computing cluster or multiple computing machines that can communicate via communication connections. Therefore, the computing device 100 can operate in a networked environment using a logical connection with one or more other servers, networked personal computers (PCs) or further general network nodes.

The input device 150 may be one or more of a variety of input devices, such as a mouse, keyboard, tracking ball, voice-input device, and the like. The output device 120 may be one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (I/O) interfaces (not shown).

In some embodiments, instead of being integrated in a single device, some or all components of the computing device 100 may also be arranged in cloud computing architecture. In the cloud computing architecture, the components may be provided remotely and work together to implement the functionalities described in the subject matter described herein. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 100 may be used to implement image/video processing in embodiments of the subject matter described herein. Therefore, hereinafter, the computing device 100 is also referred to as an "image/video processing device." The memory 120 may include one or more image/video processing modules 125 having one or more program instructions. These modules are accessible and executable by the processing unit 110 to perform the functionalities of the various embodiments described herein.

To implement image/video processing, the computing device 100 may receive a first image 170 through the input device 150. The image/video processing module 122 may perform image/video processing based on the first image 170 and generate a second image 180 with a greater resolution than the first image 170. In some embodiments, the received first image 170 may be a full image or a sub-image thereof.

In some embodiments, the first image 170 may be a full video frame. Alternatively, the first image 170 may also be a portion of a video frame, e.g., a patch, a slice, a CTU (coding tree unit) or an image block with any proper size. In this case, the first image 170 may be generated from a bitstream which may, for example, be received through the communication unit 140 from a video encoder.

It is to be understood that the images 170 and 180 illustrated in FIG. 1 are for purpose of illustration only. In other examples, any proper images may be processed and images with a higher resolution may be generated accordingly.

Generally speaking, the existing solutions for image super-resolution may be divided into three categories: interpolation-based methods, reconstruction-based methods and learning-based methods.

The interpolators are widely used for solving the image super resolution problem. The most popular interpolation methods may comprise nearest-neighbor interpolation method, bilinear interpolation method and bicubic interpolation method. The interpolation-based methods are widely used due to the lower complexity and computational cost. However, the interpolation-based methods are typically used for recovering rich textures and/or obvious edges since they are not adaptive to the image content.

The reconstruction-based methods typically enforce a reconstruction constrain. The high-resolution image is reconstructed from a low-resolution image sequence. Although the generated high-resolution image could meet the reconstruction constrain, the smoothness and texture completeness of the generated image may not be guaranteed.

The basic idea of learning-based methods is to learn a mapping from LR (low resolution) patches to their HR (high resolution) versions based on a pre-papered training data set. The training data set usually contains LR-HR patch pairs. Typically, a compact representation over dictionary elements and coefficients is learned for both LR and HR patches. The corresponding coefficients of an input patch are combined with dictionary elements to produce the HR patch. CNN based methods are now becoming more and more popular in recent years. They learn an end-to-end mapping from LR images to HR images and the dictionary elements are replaced with hidden convolutional layers.

Recently, a new learning-based image super resolution method called Rapid and Accurate Image Super Resolution (RAISR) has been proposed. The core idea for RAISR is to enhance the quality of a cheap interpolation method by applying a set of pre-trained filters on the image patches, chosen by an efficient hashing mechanism. The filters are learned based on pairs of LR and HR image patches, and the filter matching process is done by estimating the local gradients' statistics. RAISR has relative lower complexity as compared with traditional learning based SISR methods.

Figure 2A:
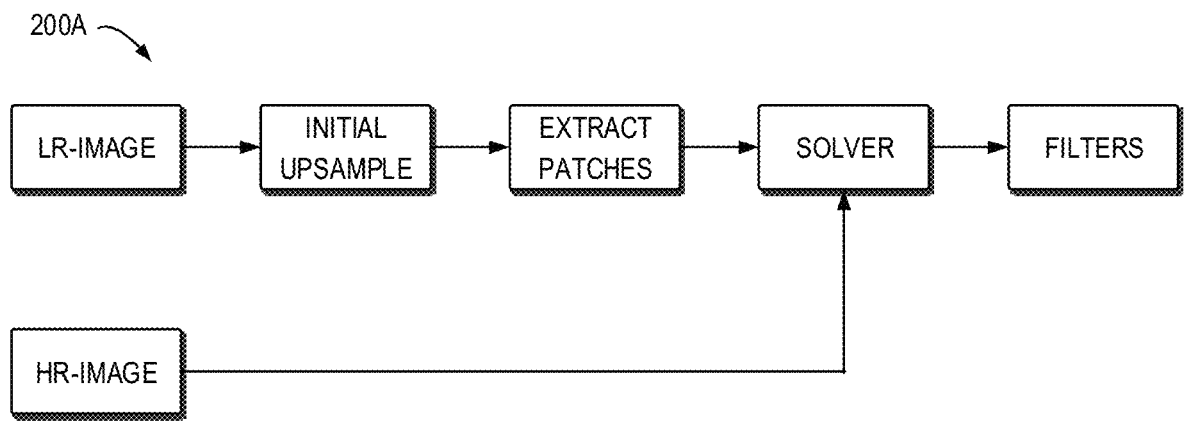
FIG. 2A illustrates a flowchart of a learning process of RAISR.

FIG. 2A illustrates a schematic diagram 200A of a learning process of RAISR. As shown in FIG. 2A, the goal of RAISR is to learn a d×d filter h that minimizes the Euclidean distance between the $\{y_i\}$ and the corresponding original HR images $\{x_i\}$, wherein d is an integer, $y_i \in \mathbb{R}^{M \times N}$ With $i=1, \ldots, L$ denotes an initial up-scaled versions of a training image. The minimization problem can be formulated as follows:

$$\min_h \sum_{i=1}^{L} \|A_i h - b_i\|_2^2 \quad (1)$$

where $h \in \mathbb{R}^{d \times d}$ denotes the filter in vector-notation, $A_i \in \mathbb{R}^{MN \times d \times d}$ denotes a matrix that contains the patches extracted from the image $y_i$ with size of d×d. The $b_i$ denotes the corresponding pixel to the center coordinates of $y_i$ patches in the original HR image $x_i$.

To be adapted to the image content, RAISR divided the image patches into groups based on an informative and geometry measures. Similar to the minimization problem mentioned above, for each group q, corresponding filter $h_q$ could be learned by minimizing the following formulation:

$$\min_{h_q} \|A_q^T A_q h_q - A_q^T b_q\|_2^2 \quad (2)$$

where $A_q$ and $b_q$ denote the patches and pixels that belong to the q-th group.

Figure 2B:
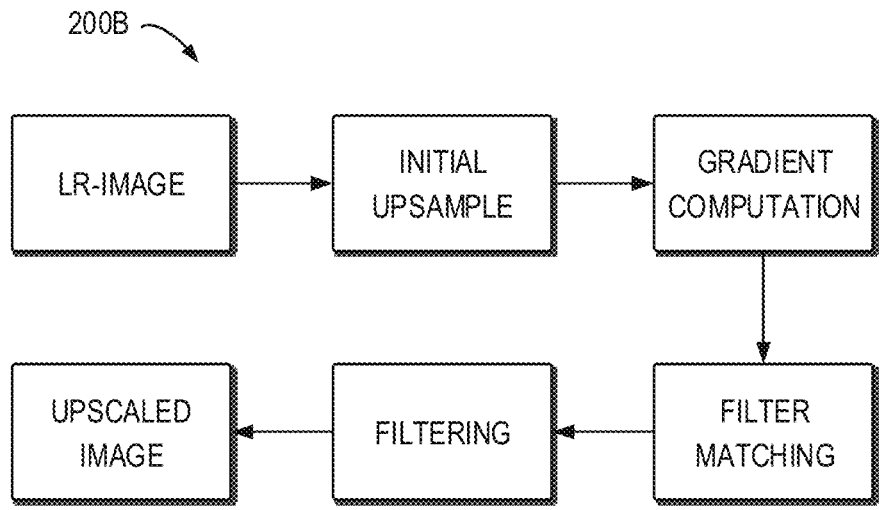
FIG. 2B illustrates a flowchart of an image up-sampling process of RAISR.

FIG. 2B illustrates a schematic diagram 200B of an image up-sampling process of RAISR. As shown in FIG. 5B, first, an initial up-sampling is performed. Typically, a bilinear interpolation method is applied.

Then, the gradient computation may be determined. Gradient initialization is firstly applied, followed by gradient refinement process. The gradient information generally contain a horizontal gradient $g_x$, a vertical gradient $g_y$ and $g_{xy}=g_x \times g_y$. Here, $g_x$ is the difference between current pixel value and right pixel value and $g_y$ is the difference between current pixel value and downside pixel value. Then, for a given window size $w_{key}$, the gradient information is refined as below:

$$g_x = \frac{1}{w_{key}^2} \sum_{i=1}^{w_{key}^2} g_{x_i}^2 \quad (3)$$

$$g_y = \frac{1}{w_{key}^2} \sum_{i=1}^{w_{key}^2} g_{y_i}^2 \quad (4)$$

$$g_{xy} = \frac{1}{w_{key}^2} \sum_{i=1}^{w_{key}^2} g_{xy_i} \quad (5)$$

where $g_{x_i}$, $g_{y_i}$, $g_{xy_i}$ composed of gradient information corresponding to the center coordinates of current pixel. That is, Gaussian kernel is used to compute the weighted average of gradient information inside a window.

The filter key of each pixel may be computed according to local gradient information. More specifically, the filter key is calculated according to the following formulations:

$$S = \frac{0.99}{g_x + g_y + e^{-4}} \quad (6)$$

$$T = S \times g_x \quad (7)$$

$$M = g_{xy} \times S + 0.49 \quad (8)$$

$$\text{key} = \lfloor \theta \times T \rfloor \times \mu + \lfloor M \times \mu \rfloor \quad (9)$$

where θ and μ are constant parameters. The best matched filter can be found though the generated filter key.

Further, a filtering process may be performed. The filter corresponds to this filter key will be selected and the filtering process can be formulated as following formulation:

$$p_{filtered} = (\Sigma_{i=0}^{d \times d} p_i \times h_i) + p_{center} \quad (10)$$

where $p_{center}$ denotes the current filtering pixel, $p_{filtered}$ denotes the updated pixel value. $p_i$ and $h_i$ denote corresponding elements in filtering window patch and filter coefficient respectively.

Though the RAISR as introduced above may have relative lower complexity as compared with traditional learning based SISR methods, the computational and memory costs during the up-sampling process, e.g., caused by the filtering processes, are still high. Therefore, people expect to further lower down the computational and memory costs.

Principle and Example Process for Image/Video Processing

According to embodiments of the subject matter described herein, a solution for image/video processing is proposed. In this solution, an intermediate image can be obtained from an LR image. Then, a smooth value associated with an image block in the intermediate image could be determined based on a gradient of a target pixel in the image block. The term "pixel" herein refers to a unit for organizing data in an image, and the terms "pixel" and "sample" may be interchangeably used in this disclosure. For example, a "pixel" may refer to a "sample" in a YUV format image.

Further, an HR image can be generated from the intermediate image based on the smooth value. In this way, the filtering process can be performed based on a smooth value of an image block, thereby improving the efficiency of image/video processing and lowering down the computational and memory costs.

The basic principles and several example embodiments of the subject matter described herein are described below with reference to the figures.

Figure 3:
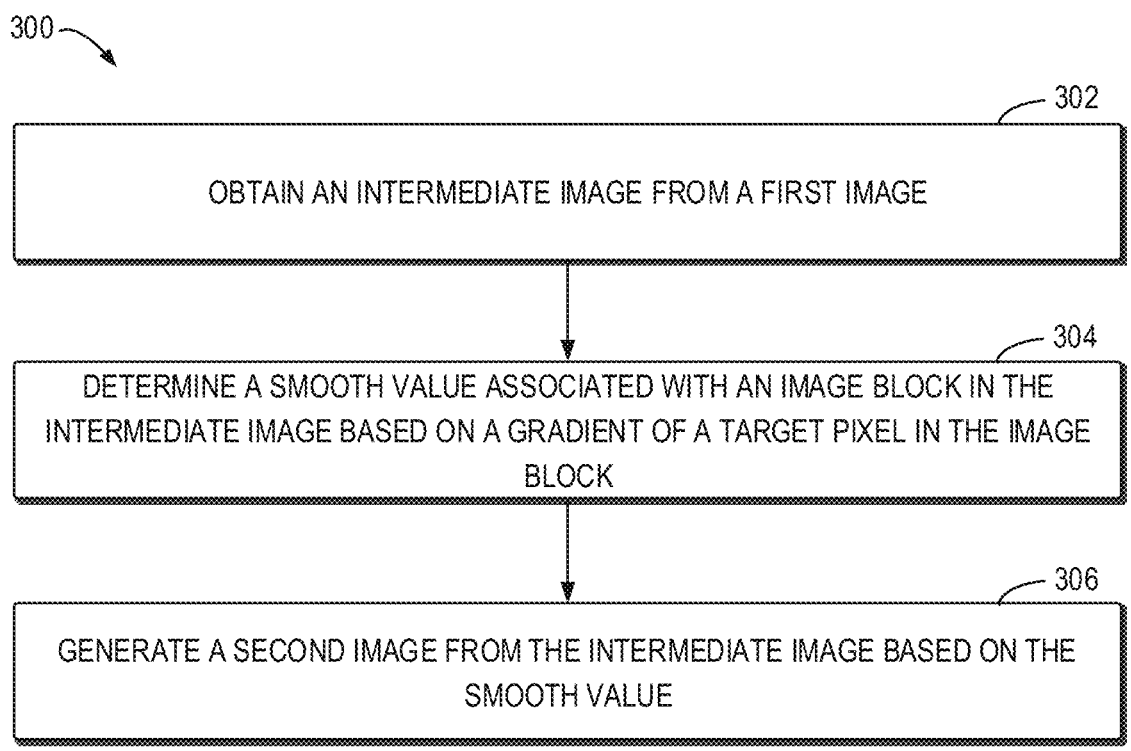
FIG. 3 illustrates a flowchart of a process of image/video processing according to some embodiments as described herein.

FIG. 3 illustrates a flowchart of a process 300 of image/video processing according to some embodiments of the subject matter as described herein. The process 300 may be implemented by the computing device 100, for example, by the image/video processing module 125 in the computing device 100. In some embodiments, the computing device 100 may be implemented as a video decoder, as will be described in detail later.

The process 300 may also be implemented by any other devices or device clusters similar to the computing device 100. For purpose of description, the process 300 is described with reference to FIG. 1.

As shown in FIG. 3, at block 302, the computing device 100 obtains an intermediate image from a first image 170, wherein the intermediate image is of a higher resolution than the first image.

In some embodiments, the computing device 100 may first receive a first image 170. For example, the first image 170 may be input by a user or be received from another device via network.

Alternatively, the computing device 100 may also receive a bitstream of a video and then decode the first image 170 from the bitstream. For example, a video encoder may encode a video into a bitstream and then transmit the encoded bitstream to a video decoder. The video decoder may then decode the first image 170 from the bitstream according to a respective video compression standard.

In some embodiments, the obtained first image 170 may be a complete video frame that is to be processed. For example, the computing device 100 (or a video decoder) may first decode the first image 170 (a video frame) from the bitstream and then generate a HR image based on the decode frame.

Alternatively, the first image 170 may comprise a portion or a sub-image of a video frame. For example, the first image 170 may be a patch of a video frame, a slice of a video frame, a CTU (coding tree unit) of a video frame or an image block with any proper size of a video frame. In this case, the computing device 100 may generate an HR image corresponding to the sub-image after decoding all the information required for image super-resolution based on the sub-image. In this way, the computing device 100 may decode the remaining sub-images of the video frame from the bitstream in parallel with the super-resolution process of the sub-image, thereby improving the efficiency of generating an HR image corresponding to the video frame.

Figure 4:
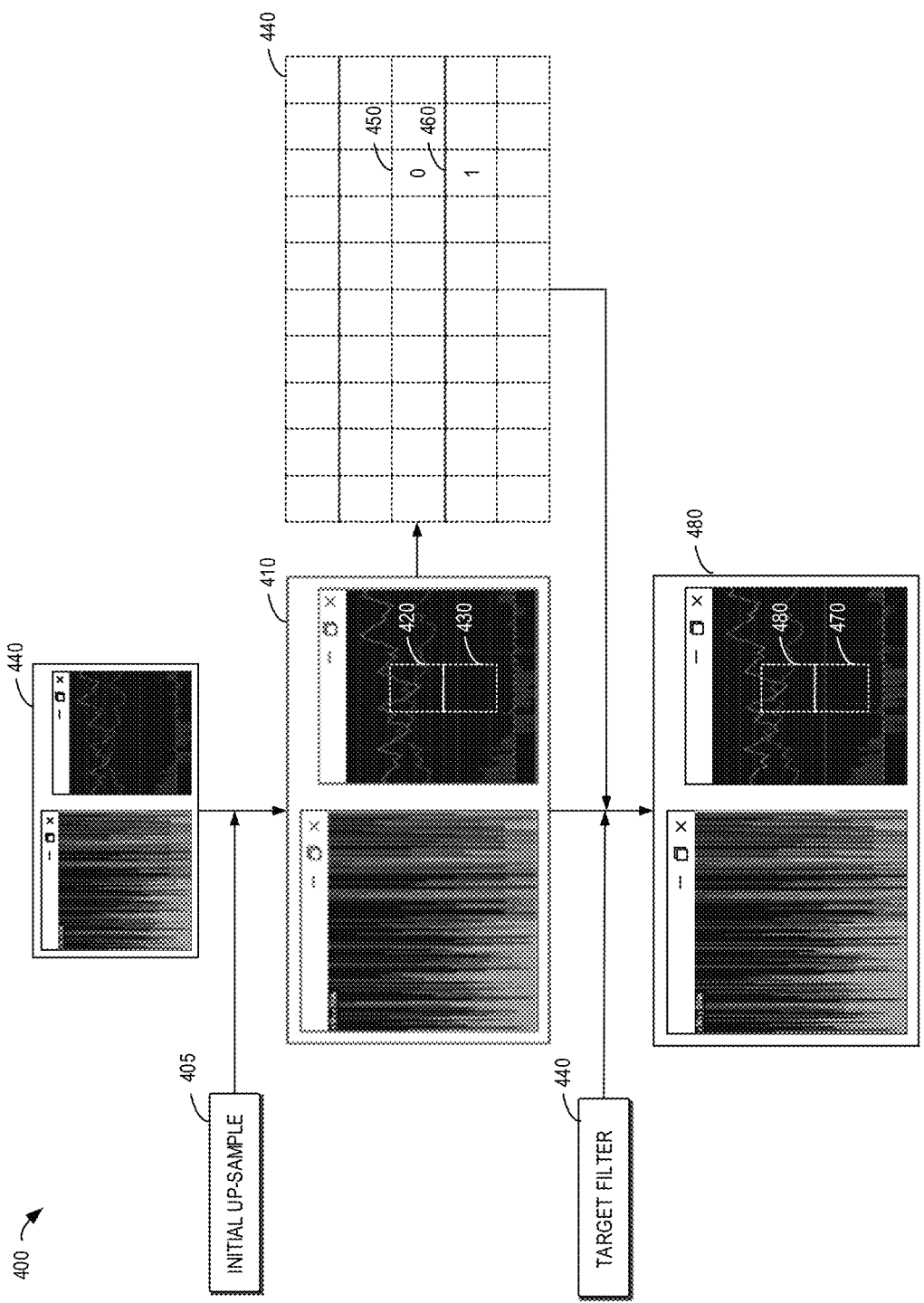
FIG. 4 illustrates a schematic diagram of image/video processing process according to some embodiments as described herein.

In some embodiments, the computing device 100 may generate an intermediate image based on the first image 170 using an interpolation method. FIG. 4 illustrates a schematic diagram 400 of image/video processing process according to some embodiments of the subject matter as described herein.

As shown in FIG. 4, after obtaining the first image 170, the computing device 100 may generate the intermediate image 410 with a higher resolution according to a pre-defined initial up-sample method 405. The examples of initial up-sample method may comprise but are not limited to: a bilinear interpolation algorithm, a bicubic interpolation algorithm, a lanczos interpolation algorithm, or a nearest-neighbor interpolation algorithm. It should be understood that any other proper up-sample methods could also be applied for generating the intermediate image 410.

In some embodiments, to generate the intermediate image 410, the computing device 100 may first determine an up-scale ratio for the first image 170. For example, the up-scale ratio may be designated by a user. Alternatively, the up-scale ratio may also be pre-defined.

In some other examples, the up-scale ratio may also be adaptively determined by the computing device 100. For example, the computing device 100 may determine the up-scale ratio based on a resolution of the first image 170 and a resolution of a target display device. In a case that a resolution of the first image 170 is 960*540 and a resolution of a target display device is 1920*1080, the computing device 100 may determine the up-scale ratio as 2 accordingly.

In some embodiments, the horizontal up-scale ratio and vertical up-scale ratio for the first image 170 may be different. In this case, the computing device 100 may determine the two up-scale ratios respectively. In a case that a resolution of the first image 170 is 640*480 and a target resolution is 1920*1080, the computing device 100 may determine the horizontal up-scale ratio as 3 and the vertical up-scale ratio as 2.25 respectively.

In some embodiment, the first image 170 may be associated with screen content. For example, the first image 170 may be a frame which is encoded based on content displayed on a screen by a video encoder. The content displayed on the screen may for example be generated by an application executing on a computing device, such as an online gaming application, a mobile web browsing application, a video conference application, an online teaching application and the like. Different from natural images/videos generated by cameras, the screen content images/videos may typically contain text, artificial backgrounds and graphics, which may lead to sharp edges and frequent transitions. As show in the example of FIG. 4, the first image 170 may for example be an image corresponding to a computer desktop, in which graphical user interfaces of one or more applications may be presented.

Referring back to FIG. 3, at block 304, the computing device 100 determines a smooth value associated with an image block in the intermediate image based on a gradient of a target pixel in the image block.

Continuing with the example of FIG. 4, the computing device 100 may first divide the intermediate image 410 to one or more image blocks, and then determine a smooth value associated with each of the image blocks. Image blocks 420 and 430 are shown in FIG. 3 for illustration.

In some embodiments, an image block may comprise M*N pixels, wherein M and N are integers greater than 0. In some cases, both M and N may be equal to 1. That is, the image block may contain only one pixel.

In this case, the computing device 100 may determine the smooth value based on a gradient of the single pixel in the image block. In the case that the image block contains only one pixel, the computing device 100 may determine the smooth value based on a gradient of the single pixel in the image block.

In some embodiments, the computing device 100 may determine the smooth value based on a horizontal gradient of the single pixel in the image block. The horizontal gradient may indicate a difference between the target pixel and a horizontally adjacent pixel. In particular, the smooth value may be determined based on at least one of: a first difference of the target pixel and a left pixel, a second difference of the target pixel and a right pixel, a sum of the first and second differences, or an average of the first and second differences.

In some other embodiments, the computing device 100 may determine the smooth value based on a vertical gradient of the single pixel in the image block. The vertical gradient may indicate a difference between the target pixel and a vertically adjacent pixel. In particular, the smooth value may be determined based on at least one of: a third difference of the target pixel and a top pixel, a fourth difference of the target pixel and a bottom pixel, a sum of the third and fourth differences, or an average of the third and fourth differences.

In some further embodiments, the computing device 100 may determine the smooth value based on a diagonal gradient of the target pixel, which may indicate a difference between the target pixel and a diagonally adjacent pixel. In some embodiments, a diagonal gradient may comprise a 45-degree gradient or a 135-degree gradient.

For example, a 45-degree gradient may be determined based on at least one of: a fifth difference between the target pixel and its corresponding right-top pixel, a sixth difference between the target pixel and its corresponding left-bottom pixel, a sum of the fifth and sixth differences, or an average of the fifth and sixth differences.

A 135-degree gradient may be determined based on at least one of: a seventh difference between the target pixel and its corresponding left-top pixel, an eighth difference between the target pixel and its corresponding right-bottom pixel, a sum of the seventh and eighth difference, or an average of the seventh and eighth difference.

In some embodiments, if a target pixel is located at a boundary of an image, the pixels which are out of the boundary may be padded through copying the boundary pixels when calculating the gradient of the target pixel. The smooth value determined based on the 135-degree gradient may be referred to as a 135-degree smooth value.

In some embodiments, values for the differences (e.g., the first, second, third, fifth, sixth, seventh or eighth difference) as discussed above for determining the smooth value may be unsigned. In other words, only the absolute values of these differences are to be considered.

In some further embodiments, an image block (e.g., image block 420 or 430) may also comprise a plurality of pixels. That is, either M or N is equal than 1. In this case, the computing device may select at least one pixel from the plurality of pixels as the target pixel.

In some embodiments, the target pixel may comprise all the plurality of pixels in the image block. For example, the computing device 100 may determine a horizontal gradient of each of the plurality of pixels in the image block, and then determine a smooth value (also referred to as a smooth value in a horizontal direction) based on the horizontal gradient of each of the plurality of pixels. For example, a weighted sum of these horizontal gradients may be used to indicate the smooth value in the horizontal direction.

In some other embodiments, the computing device 100 may determine a vertical gradient of each of the plurality of pixels in the image block, and then determine a smooth value (also referred to as a smooth value in a vertical direction) based on the vertical gradient of each of the plurality of pixels. For example, a weighted sum of these vertical gradients may be used to indicate the smooth value in the vertical direction.

In some further embodiments, the computing device 100 may determine a diagonal gradient of each of the pixels in the image block, and then determine a smooth value (also referred to as a smooth value in a diagonal direction) based on the diagonal gradient of each of the pixels. For example, a weighted sum of these diagonal gradients may be used to indicate the smooth value in the diagonal direction.

In some embodiments, to reduce the calculation cost, the computing device 100 may determine a smooth value of the image block based on only a single pixel of the plurality of pixels in the image block. For example, for an image block comprising 3*3 pixels, the smooth value of the image block may be determined using only the gradient of the central pixel in the image block.

In some further embodiments, the computing device 100 may determine a smooth value of the image block based on two or more pixels in the image block, but not based on all of the plurality of pixels. For the example of an image block comprising 3*3 pixels, the computing device 100 may K (1<K<9) target pixels from the image block, and then determine the smooth value of the image block based on an averaged sum of the gradients of the selective K pixels.

It should be understood that a smooth value in a different directions (horizontal, vertical, 45-degree diagonal or 135-degree diagonal) as discussed above may also be determined based on a gradient in the corresponding direction of a target pixel, or based on multiple gradients in the corresponding direction of multiple target pixels (e.g., a selective subset of the plurality of pixels in the image block).

In some embodiments, the smooth value in a single direction (horizontal, vertical, 45-degree diagonal or 135-degree diagonal) may be determined and used by the computing device for generating the mask information, as will be discussed later. Alternatively, the smooth value in two or more directions (horizontal, vertical, 45-degree diagonal or 135-degree diagonal) may be determined and used by the computing device for generating the mask information.

Referring to FIG. 3, at block 308, the computing device 100 generates a second image 180 from the intermediate image based on the smooth value, wherein the second image 180 is of a higher resolution than the first image 170.

In some embodiments, the computing device 100 may determine mask information for the intermediate image 410 based on the smooth value, wherein the mask information at least indicate whether an image block in the intermediate image 410 is to be filtered.

Continuing with the example of FIG. 4, the computing device 100 may determine the mask information 440 for the intermediate image 410 based on the smooth value of the image block in the intermediate image 410.

In some embodiments, the mask information 440 may indicate only which of the plurality of image blocks are not to be filtered. For example, the computing device 100 may determine the mask information 440 by comparing the smooth value with a threshold. If the smooth value of an image block is greater than a threshold, the mask information 440 may be set for indicating that the image block is not to be filtered.

For example, the mask information 440 may comprise an element(s) which is corresponding to the image block(s) which are determined not to be filtered. The element may for example indicate the identification of the image block not to be filtered.

In some other embodiments, the mask information 440 may indicate only which of the plurality of image blocks are to be filtered. For example, if the smooth value of an image block is less than or equal to a threshold, the mask information 440 may be set for indicating that the image block is to be filtered.

For example, the mask information 440 may comprise an element(s) which is corresponding to the image block(s) which are determined to be filtered. The element may for example indicate the identification of the image block to be filtered.

In some further embodiments, the mask information 440 may comprise a plurality of elements for indicating whether each the plurality of image blocks is to be filtered or not. For example, as shown in the example of FIG. 4, the mask information 440 comprise a plurality of elements, each of which corresponding to an image block. As an example, the element 450 may indicate that the image block 420 is to be filtered, and the element 460 may indicate that the image block 430 is not to be filtered.

It should be understood that, a smooth value being greater than a threshold is aimed to indicate that the pixel(s) in image block are not significantly changed as compared to adjacent pixel(s). A smooth value being greater than a threshold herein may be determined according to that a weighted sum of the gradients of the pixels in the image block is less than a corresponding threshold, or that a reciprocal of the weighted sum is greater than a threshold.

In some embodiments, the computing device 100 may determine the mask information 440 based on a smooth value in a 45-degree direction and a smooth value in a 135-degree direction of the image block.

As an example, the computing device 100 may compare both the smooth value in a 45-degree direction and the smooth value in a 135-degree direction of the image block with a threshold. If both of them are less than the threshold, an element corresponding to the image block may be set as a first value (e.g., "1") for indicating that that the image block is not to be filtered. Otherwise, if any of them is greater than or equal to the threshold, an element corresponding to the image block may be set as a second value (e.g., "0") for indicating that that the image block is to be filtered.

Alternatively, the computing device 100 may compare both a reciprocal of the smooth value in a 45-degree direction and a reciprocal of the smooth value in a 135-degree direction of the image block with a threshold. If both are greater than the threshold, an element corresponding to the image block may be set as a first value (e.g., "1") for indicating that that the image block is not to be filtered. Otherwise, if any of them is less than or equal to the threshold, an element corresponding to the image block may be set as a second value (e.g., "0") for indicating that that the image block is to be filtered.

In some other embodiments, the computing device 100 may determine the mask information 440 based on a smooth value in a horizontal direction and a smooth value in a vertical direction of the image block.

For example, the computing device 100 may compare both the smooth value in a horizontal direction and the smooth value in a vertical direction with a threshold. If both of them are less than the threshold, an element corresponding to the image block may be set as a first value (e.g., "1") for indicating that that the image block is not to be filtered. Otherwise, if any of them is greater than or equal to the threshold, an element corresponding to the image block may be set as a second value (e.g., "0") for indicating that that the image block is to be filtered.

Alternatively, the computing device 100 may compare both a reciprocal of the smooth value in a horizontal direction and a reciprocal smooth value in a vertical direction with a threshold. If both of them are greater than the threshold, an element corresponding to the image block may be set as a first value (e.g., "1") for indicating that that the image block is not to be filtered. Otherwise, if any of them is less than or equal to the threshold, an element corresponding to the image block may be set as a second value (e.g., "0") for indicating that that the image block is to be filtered.

In some further embodiments, the computing device 100 may determine the mask information 440 based on a weighted sum of two or more of: a smooth value in a 45-degree direction, a smooth value in a 135-degree direction of the image block, a smooth value in a horizontal direction and a smooth value in a vertical direction of the image block.

For example, the computing device 100 may compare a weighted sum of a smooth value in a horizontal direction and a smooth value in a vertical direction with a threshold. If the weighted sum is less than the threshold, an element corresponding to the image block may be set to a first value (e.g., "1") for indicating that that the image block is not to be filtered. Otherwise, if the value is greater than or equal to the threshold, an element corresponding to the image block may be set to a second value (e.g., "0") for indicating that that the image block is to be filtered.

Alternatively, the computing device 100 may also compare a reciprocal of a weighted sum of a smooth value in a horizontal direction and a smooth value in a vertical direction with a threshold. If the reciprocal is greater than the threshold, an element corresponding to the image block may be set to a first value (e.g., "1") for indicating that that the image block is not to be filtered. Otherwise, if the value is less than or equal to the threshold, an element corresponding to the image block may be set to a second value (e.g., "0") for indicating that that the image block is to be filtered.

By comparing the smooth value with a threshold, the solution described herein may determine which of the image blocks are smooth and which of the image blocks are sharp. Moreover, the solution described herein may further skip the gradient refinement process and filtering process if an image block is determined as enough smooth, which will be described in detail later.

As shown in the example of FIG. 4, the element 450 corresponding to the image block 420 is set to a value "0" for indicating that the image block 420 is to be filtered. On the contrary, the element 420 corresponding to the image block 430 is set to a value "1" for indicating that the image block 430 is to not be filtered.

Figure 5:
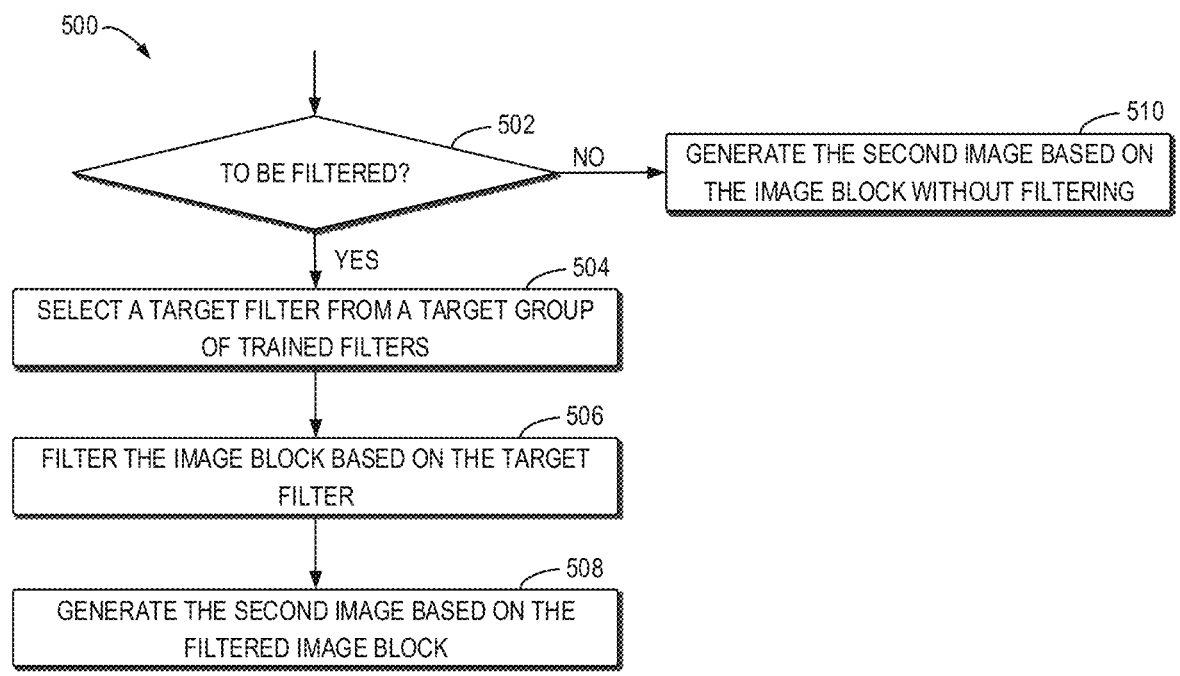
FIG. 5 illustrates a flowchart of a process of generating the second image according to some embodiments as described herein.

The details of the generating the second image 180 will be described with reference to FIG. 5. FIG. 5 illustrates a flowchart of a process 500 of generating the second image according to some embodiments of the subject matter as described herein.

As shown in FIG. 5, at block 502, the computing device 100 may determine whether an image block is to be filtered based on the mask information 440. If it is determined at block 502 that the image block is not to be filtered, the process may proceed to block 510, where the computing device 100 may generate the second image 180 based on the image block without filtering.

Taking FIG. 4 as an example, in accordance with a determination that a value of the element 460 in the mask information is "1", the computing device 100 may determine that no filtering process is required for the corresponding image block 430. Therefore, in the generated second image 180, the image block 430 generated by the initial up-sample method 405 is kept.

If it is determined at block 502 that the image block is to be filtered, the process may proceed to block 504, the computing device 100 may select a target filter from a target group of trained filters. Continuing with the example of FIG. 4, when a value of the element 450 is "0", the computing device 100 may determine that the corresponding image block 420 is to be filtered, and may then select a target filter corresponding to the image block 420.

In some embodiments, the computing device 100 may first determine a filter key associated with first image block 420. In some embodiments, the filter key may be determined according to the following formulations:

$$S = \frac{0.99}{(g_x)^2 + (g_y)^2 + e^{-4}} \quad (11)$$

$$T = S \times (g_x)^2 \quad (12)$$

$$\text{key} = \lfloor \theta \times T \rfloor \times \mu + \lfloor 0.49 \times \mu \rfloor \quad (13)$$

where $g_x$ and $g_y$ denote horizontal and vertical gradients corresponding to the center coordinates of current pixel, and $\theta$ and $\mu$ are constant parameters.

Different from the formulation (9) used in the RAISR solution, the filter key determined according to the solution according to the present disclosure is irrelevant to the product of the horizontal and vertical gradients. There is a high possibility that one of the horizontal and vertical gradients of a pixel in a screen content image might be 0, and therefore the product would be useless when determining the filter key according to the RAISR solution. By amending the product based function to a constant, a more proper filter could be determined accordingly, and a better performance may be achieved in a case a screen content image is processed.

In some embodiments, the horizontal and vertical gradients corresponding to the center coordinates of current pixels may be refined before being used to determine the filter key. For example, the average of gradients for each direction (e.g., horizontal, vertical, and/or diagonal) for all pixels within a sub-region is calculated and used as the refined gradient for all pixels within the sub-region.

In some embodiments, multiple groups of trained filters may be pre-configured. Each of the set of trained filters may be trained with different up-scale ratios and may comprise multiple trained filters. In one example, totally M (e.g., M=9) groups of filters are trained and maintained to cover almost all commonly up-scale ratios.

In this case, the computing device may determine an up-scale ratio for the first image; and then selecting the target group of trained filters trained with a training up-scale ratio matching the determined up-scale ratio.

For example, the training up-scale ratios of the M groups of trained filters comprise (1/0.1, 1/0.2, 1/0.3, 1/0.4, 1/0.5, 1/0.6, 1/0.7, 1/0.8, 1/0.9). In one example, the group of filters trained for an up-scale ratio of 1/k (e.g., k=0.1) which is the greatest up-scale ratio used for training may be applied for cases with up-scale ratio falling in the range $$\left[\frac{1}{k - 0.05}, \infty\right).$$

For example, if an up-scale ratio for the first image 170 is "21", then it falls in the range $$\left[\frac{1}{0.1 - 0.05}, \infty\right),$$

and the group of filters trained for an up-scale ratio 1/0.1 might be used.

In one example, the group of filters trained for an up-scale ratio of 1/p (e.g., p=0.9) which is the least ratio in M is used by cases with up-scale ratio in $$\left(0, \frac{1}{p - 0.05}\right).$$

For example, if an up-scale ratio for the first image 170 is 1.11, then it falls in the range $$\left[0, \frac{1}{0.85}\right),$$

and the group of filters trained for an up-scale ratio 1/0.9 might be used.

In one example, the group of filters trained for an up-scale ratio 1/q (e.g., q=0.5) will be used by case with up-scale ratio in the range $$\left[\frac{1}{q + 0.05}, \frac{1}{q - 0.05}\right).$$

For example, if an up-scale ratio for the first image 170 is 2, then it falls in the range $$\left[\frac{1}{0.5 + 0.05}, \frac{1}{0.5 - 0.05}\right),$$

and the group of filters trained for an up-scale ratio 1/0.9 might be used.

In some further embodiments, as discussed above, a horizontal up-scale ratio and a vertical up-scale ratio for the first image 170 might be different. In this case, two different target filters may be selected respectively. For example, the computing device 100 may select, from multiple groups of trained filters trained with different up-scale ratios, a first group of trained filters based on the horizontal up-scale ratio; and then select, from the multiple groups of trained filters, a second group of trained filters based on the vertical up-scale ratio. The first group of trained filters may be used for filtering in a horizontal direction, and the second group of trained filters may be used for filtering in a vertical direction.

At block 506, the computing device 100 may filter the image block based on the target filter to obtain a filtered image block. For example, the computing device 100 may select the target filter 470 from the target group of filters based on the key filter and then filter the image block 420 using the target filter 470.

In some embodiments, if a horizontal up-scale ratio and a vertical up-scale ratio for the first image 170 are different, the computing device 100 may filter the image block by using a first target filter selected from the first group of trained filters in a horizontal direction; and then filter the filtered image block using a second target filter selected from the second group of trained filters in a vertical direction.

Figure 6:
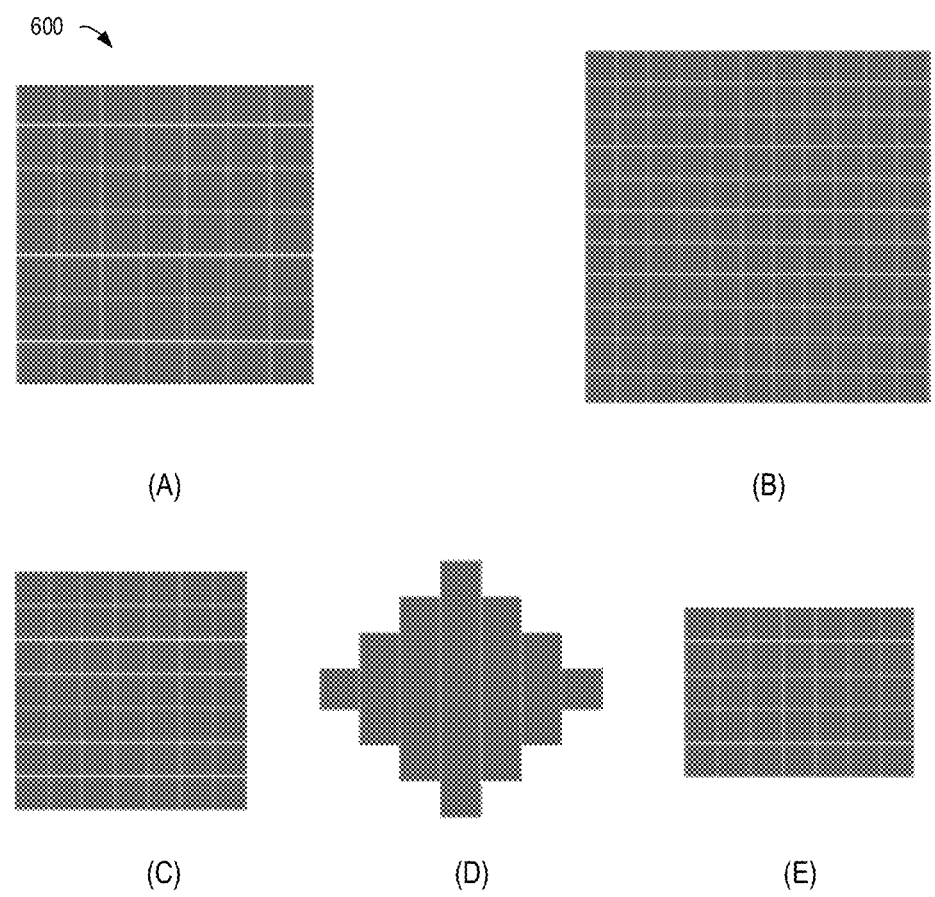
FIG. 6 illustrates some example filters 900 according to some embodiments as described herein.

FIG. 6 illustrates some example filters 600 according to some embodiments of the subject matter as described herein. As shown in FIG. 6, the filters might have a square size of 7*7 or 11*11 pixels. Alternatively, the filters have another symmetric size or an asymmetric size.

Referring to FIG. 5, at block 508, the computing device 100 may generate the second image 180 based on the filtered image block. For example, as shown in FIG. 4, the computing device 100 may generate the updated image block 480 by filtering the image block 420.

In some embodiments, the computing device 100 may filter the original image block to obtain a filtered image block. In a case that a difference between a pixel in the original image block and a corresponding pixel in the filtered image block is greater than a threshold, the computing device 100 may blend the original image block in the intermediate image and the filtered image block to obtain the updated image block 480. For example, the computing device 100 may replace the corresponding pixel in the filtered image block using the pixel in the original image block.

In some embodiments, the computing device 100 may determine, based on the mask information 440, that a first set of image blocks in the intermediate image 410 are to be updated. Then, the computing device 100 may filter each of the first set of image blocks using corresponding target filter and then generate the second image 180 using the filtered image blocks.

In some embodiments, the computing device 100 may determine, based on the mask information 440, that a second set of image blocks in the intermediate image 410 are not to be updated. In this case, the second set of image blocks are used to generate the second image 180 without being filtered.

In some embodiments, to further reduce processing time, the up-sampling processes as described above may be performed in parallel for different image units. An image unit may be an image region any size, e.g., a full image or a sub-image.

For example, the first image might be a first sub-image of a target image, e.g., a patch of a frame. In this case, the computing device 100 may generate an HR image (referred to a third image) based on a second sub-image of the target image in parallel with generating the second image based on the first image, and then generate an up-scaled image (e.g., an up-scaled fame) for the target image based on the second image and the third image.

In some further embodiments, the processing of different image blocks in the first image 170 may also be performed in parallel. For a first image 170 with size of w×h, the number of image blocks is set according to the thread number t. According to such strategy, the first image 170 is divided into t image blocks (also referred to as slices) denoted by [$s_1, s_2, s_3 \ldots s_t$]. The width of each slice is equal to original image width w. For height of each slice, we first calculate the $h_{slice} = \lfloor h/t \rfloor$ and the height of $s_1$ to $s_{t-1}$ are set equal to $h_{slice}$. The height of last slice $s_t$ is calculated by $h - h_{slice} \times (t-1)$. In this way, these slices may be processed simultaneously without any dependency, thereby improving the processing efficiency.

Note that the phrase "in parallel" herein means that performing of different processes is partially overlapped in time. It is not intended to require that the processes shall be started at a same time or ended at a same time.

According to the solution described above, the filtering processing on some image blocks which are determined as smooth may be skipped. In this way, the computational and memory cost for image generating may be reduced. Further, considering the characteristics of a screen content image, the image super-resolution solution may significantly improve the performance when being applied to such types of images.

Training of Image Super-Resolution Filters

In some embodiments, when training the image super-resolution filters as discussed above, a simple way may be utilized to solve the minimization problem as discussed with formulation (2) is to let $A^T_q A_q h_q$ equal to $A^T_q b_q$ and utilize Orthogonal-triangular matrix decomposition to obtain the filter for each group.

In some embodiments, to generate more stable and accurate filter, Singular Value Decomposition SVD decomposition may be utilized to obtain the filter for each group and iteratively update the filter according to the residual. For each group, it is defined that $Q_q = A^T_q A_q$, and $V_q = A^T_q b_q$. Let parameter λ decrease from 1 to $e^{-8}$ with step size of 0.1. The filter generating process can be formulated as $$\min_{h_q} \|Q_q h_q - V_q\|_2^2 \quad (14)$$

For each iterative step, it is defined that:

$$Q_q = Q_q + \lambda \times \begin{pmatrix} 1 & \ldots & 0 \\ \vdots & 1 & \vdots \\ 0 & \ldots & 1 \end{pmatrix} \quad (15)$$

Further, a two-sided Jacobi SVD decomposition may be used to solve above minimization problem and get the filter coefficients for the group q.

In some embodiments, gradients' angle may be disregarded during training of the multiple groups of trained filters.

In some embodiments, each filter of the multiple trained filters is trained with screen content images.

In some embodiments, each filter of the multiple trained filters is trained with both natural images and screen content images, and a number of the natural images is less than a number of the screen content images.

Video Encoding and Decoding

As discussed above, the first image might be a frame or a portion of a frame, which is encoded in a bitstream. In this case, a video decoder may decode the first image 170 from a bitstream received from a video encoder, and then generate the second image 180 for outputting the final decoded video according to the image super-resolution method as described above.

In some embodiments, the video decoder 300 may utilize some information decoded in the bitstream. In one example, the first image is a first frame, and the first frame is a reference frame of a second frame. The video decoder 300 may decode a reuse flag (referred to a first flag) from the bitstream. The first flag may indicate whether an up-sampling process on the second frame is to be skipped. If the first flag indicates that that the up-sampling process on the second frame is to be skipped, the video decoder 300 may determine the second image 180 as an output frame of the second frame.

In a further example, the video decoder may obtain the block segmentation information from the bitstream, and divide a frame into a plurality of sub-images based on the block segmentation information. For example, the first image is a first sub-image, and the first sub-image is a reference sub-frame of a second sub-frame.

In some embodiments, the video decoder may decode a flag (referred to a second flag) from the bitstream, which indicate whether an up-sampling process on the second sub-frame is to be skipped. In particular, the video decoder 300 may determine the reference sub-image based on motion information of reuse information of the second sub-image, wherein the reuse information comprise at least one of: Motion Vector (MV), Block Vector (BV) or reference frame of the second sub-image.

If the second flag decoded from the bitstream indicates that an up-sampling process of the second sub-image is to be skipped, the video decoder may further determine the second image 180 as an output frame of the second sub-frame.

In this way, the information encoded in the bitstream may further help to improve the efficiency of image super-resolution.

In some embodiments, the video decoder may generate a video based on the generated second image 180 with a higher resolution than the first image 170. The generated video may further to provide to a user via any proper video presenting devices, e.g., a display device or a projector.

Example Video Encoder and Decoder

The video encoder and decoder as discussed above may be implemented according to the description with reference to FIGS. 7-9 below.

Figure 7:
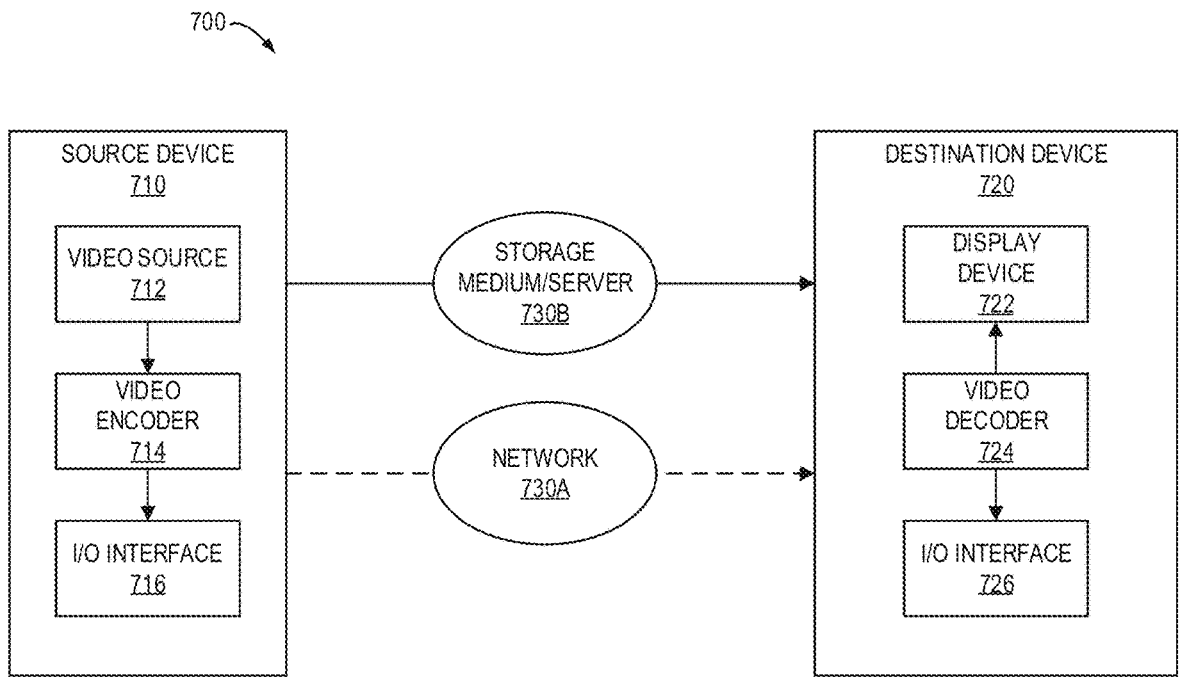
FIG. 7 is a block diagram that illustrates an example video coding system, in accordance with some embodiments of the present disclosure.

FIG. 7 is a block diagram that illustrates an example video coding system 700 that may utilize the techniques of this disclosure. As shown, the video coding system 700 may include a source device 710 and a destination device 720. The source device 710 can be also referred to as a video encoding device, and the destination device 720 can be also referred to as a video decoding device. In operation, the source device 710 can be configured to generate encoded video data and the destination device 720 can be configured to decode the encoded video data generated by the source device 710. The source device 710 may include a video source 712, a video encoder 714, and an input/output (I/O) interface 716.

The video source 712 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 714 encodes the video data from the video source 712 to generate a bitstream. The bitstream may include a sequence of bits that form an encoded representation of the video data. For example, the bitstream may include encoded pictures and associated data. The encoded picture is an encoded representation of a picture. The associated data may include sequence parameter sets, picture parameter sets, and other syntax structures. The I/O interface 716 may include a modulator/demodulator and/or a transmitter. The encoded video data may be transmitted directly to destination device 720 via the I/O interface 716 through the network 730A. The encoded video data may also be stored onto a storage medium/server 730B for access by destination device 720.

The destination device 720 may include an I/O interface 726, a video decoder 724, and a display device 722. The I/O interface 726 may include a receiver and/or a modem. The I/O interface 726 may acquire encoded video data from the source device 710 or the storage medium/server 730b. The video decoder 724 may decode the encoded video data. The display device 722 may display the decoded video data to a user. The display device 722 may be integrated with the destination device 720, or may be external to the destination device 720 which be configured to interface with an external display device.

The video encoder 714 and the video decoder 724 may operate according to a video compression standard, such as the High Efficiency Video Coding (HEVC) standard, Versatile Video Coding (VVC) standard and other current and/or further standards.

Figure 8:
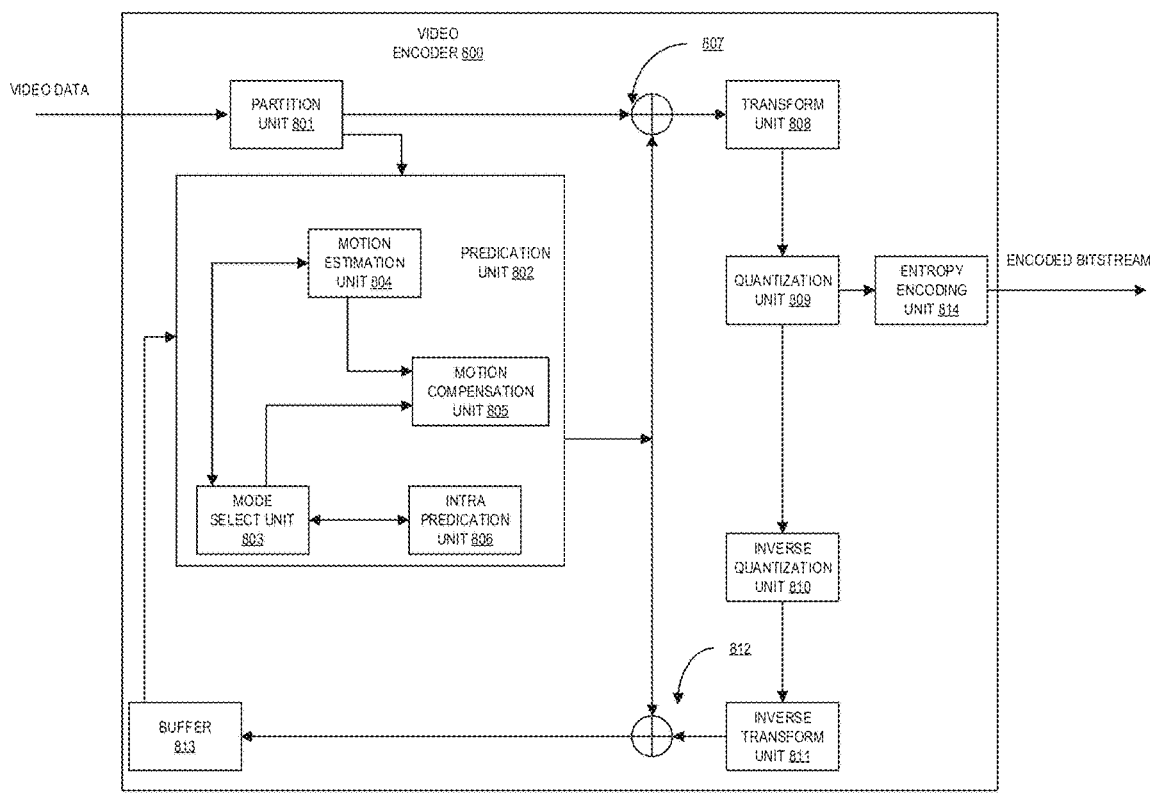
FIG. 8 is a block diagram that illustrates a first example video encoder, in accordance with some embodiments of the present disclosure.

FIG. 8 is a block diagram illustrating an example of video encoder 800, which may be an example of the video encoder 714 in the system 700 illustrated in FIG. 7, in accordance with some embodiments of the present disclosure.

The video encoder 800 may be configured to implement any or all of the techniques of this disclosure. In the example of FIG. 8, the video encoder 800 includes a plurality of functional components. The techniques described in this disclosure may be shared among the various components of the video encoder 800. In some examples, a processor may be configured to perform any or all of the techniques described in this disclosure.

In some embodiments, the video encoder 800 may include a partition unit 801, a predication unit 802 which may include a mode select unit 803, a motion estimation unit 804, a motion compensation unit 805 and an intra-prediction unit 806, a residual generation unit 807, a transform unit 808, a quantization unit 809, an inverse quantization unit 810, an inverse transform unit 811, a reconstruction unit 812, a buffer 813, and an entropy encoding unit 814.

In other examples, the video encoder 800 may include more, fewer, or different functional components. In an example, the predication unit 802 may include an intra block copy (IBC) unit. The IBC unit may perform predication in an IBC mode in which at least one reference picture is a picture where the current video block is located.

Furthermore, although some components, such as the motion estimation unit 804 and the motion compensation unit 805, may be integrated, but are represented in the example of FIG. 8 separately for purposes of explanation.

The partition unit 801 may partition a picture into one or more video blocks. The video encoder 800 and the video decoder may support various video block sizes.

The mode select unit 803 may select one of the coding modes, intra or inter, e.g., based on error results, and provide the resulting intra-coded or inter-coded block to a residual generation unit 807 to generate residual block data and to a reconstruction unit 812 to reconstruct the encoded block for use as a reference picture. In some embodiments, the mode select unit 803 may select a combination of intra and inter predication (CIIP) mode in which the predication is based on an inter predication signal and an intra predication signal. The mode select unit 803 may also select a resolution for a motion vector (e.g., a sub-pixel or integer pixel precision) for the block in the case of inter-predication.

To perform inter prediction on a current video block, the motion estimation unit 804 may generate motion information for the current video block by comparing one or more reference frames from buffer 813 to the current video block. The motion compensation unit 805 may determine a predicted video block for the current video block based on the motion information and decoded samples of pictures from the buffer 813 other than the picture associated with the current video block.

The motion estimation unit 804 and the motion compensation unit 805 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some embodiments, the motion estimation unit 804 may perform uni-directional prediction for the current video block, and the motion estimation unit 804 may search reference pictures of list 0 or list 1 for a reference video block for the current video block. The motion estimation unit 804 may then generate a reference index that indicates the reference picture in list 0 or list 1 that contains the reference video block and a motion vector that indicates a spatial displacement between the current video block and the reference video block. The motion estimation unit 804 may output the reference index, a prediction direction indicator, and the motion vector as the motion information of the current video block. The motion compensation unit 805 may generate the predicted video block of the current block based on the reference video block indicated by the motion information of the current video block.

Alternatively, in other embodiments, the motion estimation unit 804 may perform bi-directional prediction for the current video block. The motion estimation unit 804 may search the reference pictures in list 0 for a reference video block for the current video block and may also search the reference pictures in list 1 for another reference video block for the current video block. The motion estimation unit 804 may then generate reference indexes that indicate the reference pictures in list 0 and list 1 containing the reference video blocks and motion vectors that indicate spatial displacements between the reference video blocks and the current video block. The motion estimation unit 804 may output the reference indexes and the motion vectors of the current video block as the motion information of the current video block. The motion compensation unit 805 may generate the predicted video block of the current video block based on the reference video blocks indicated by the motion information of the current video block.

In some examples, the motion estimation unit 804 may output a full set of motion information for decoding processing of a decoder. Alternatively, in some embodiments, the motion estimation unit 804 may signal the motion information of the current video block with reference to the motion information of another video block. For example, the motion estimation unit 804 may determine that the motion information of the current video block is significantly similar to the motion information of a neighboring video block.

In one example, the motion estimation unit 804 may indicate, in a syntax structure associated with the current video block, a value indicating to the video decoder that the current video block has the same motion information as another video block.

In another example, the motion estimation unit 804 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, the video encoder 800 may predictively signal the motion vector. Two examples of predictive signaling techniques that may be implemented by video encoder 800 include advanced motion vector predication (AMVP) and merge mode signaling.

The intra prediction unit 806 may perform intra prediction on the current video block. When the intra prediction unit 806 performs intra prediction on the current video block, the intra prediction unit 806 may generate prediction data for the current video block based on decoded samples of other video blocks in the same picture. The prediction data for the current video block may include a predicted video block and various syntax elements.

The residual generation unit 807 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 807 may not perform the subtracting operation.

The transform processing unit 808 may generate one or more transform coefficient video blocks for the current video block by applying one or more transforms to a residual video block associated with the current video block.

After the transform processing unit 808 generates a transform coefficient video block associated with the current video block, the quantization unit 809 may quantize the transform coefficient video block associated with the current video block based on one or more quantization parameter (QP) values associated with the current video block.

The inverse quantization unit 810 and the inverse transform unit 811 may apply inverse quantization and inverse transforms to the transform coefficient video block, respectively, to reconstruct a residual video block from the transform coefficient video block. The reconstruction unit 812 may add the reconstructed residual video block to corresponding samples from one or more predicted video blocks generated by the predication unit 802 to produce a reconstructed video block associated with the current block for storage in the buffer 813.

After the reconstruction unit 812 reconstructs the video block, loop filtering operation may be performed reduce video blocking artifacts in the video block.

The entropy encoding unit 814 may receive data from other functional components of the video encoder 800. When entropy encoding unit 814 receives the data, entropy encoding unit 814 may perform one or more entropy encoding operations to generate entropy encoded data and output a bitstream that includes the entropy encoded data.

Figure 9:
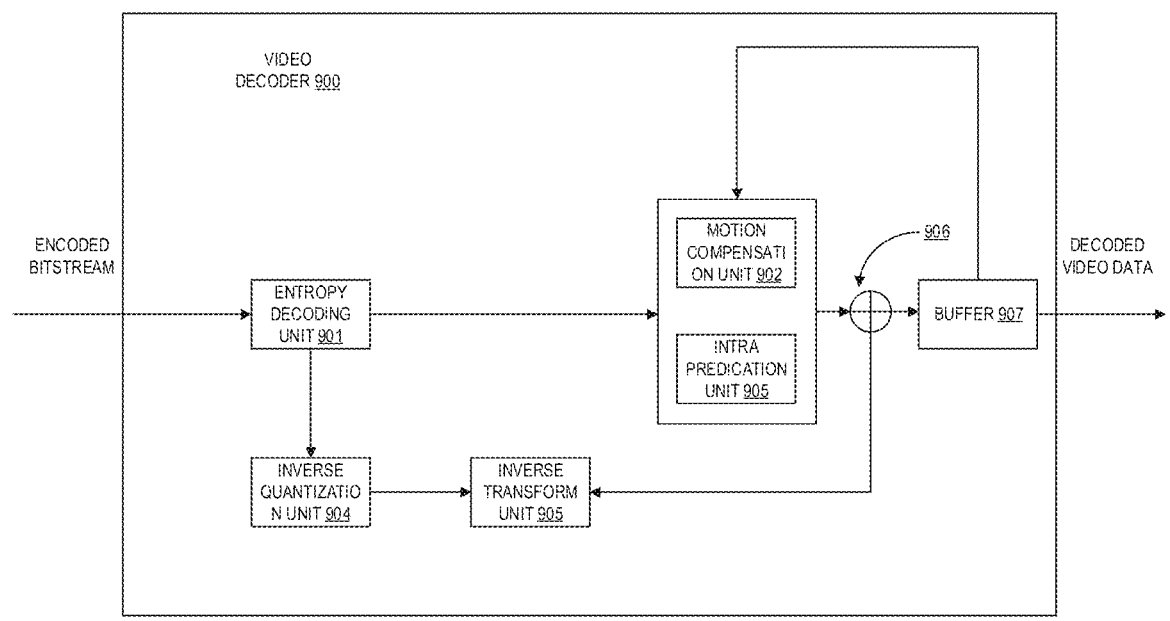
FIG. 9 is a block diagram that illustrates an example video decoder, in accordance with some aspects of the present disclosure.

FIG. 9 is a block diagram illustrating an example of video decoder 900, which may be an example of the video decoder 724 in the system 700 illustrated in FIG. 7, in accordance with some aspects of the present disclosure.

The video decoder 900 may be configured to perform any or all of the techniques of this disclosure. In the example of FIG. 9, the video decoder 900 includes a plurality of functional components. The techniques described in this disclosure may be shared among the various components of the video decoder 900. In some examples, a processor may be configured to perform any or all of the techniques described in this disclosure.

In the example of FIG. 9, the video decoder 900 includes an entropy decoding unit 901, a motion compensation unit 902, an intra prediction unit 909, an inverse quantization unit 904, an inverse transformation unit 905, and a reconstruction unit 906 and a buffer 907. The video decoder 900 may, in some examples, perform a decoding pass generally reciprocal to the encoding pass described with respect to video encoder 800 (as shown in FIG. 8).

The entropy decoding unit 901 may retrieve an encoded bitstream. The encoded bitstream may include entropy coded video data (e.g., encoded blocks of video data). The Entropy decoding unit 901 may decode the entropy coded video data, and from the entropy decoded video data, the motion compensation unit 902 may determine motion information including motion vectors, motion vector precision, reference picture list indexes, and other motion information. The motion compensation unit 902 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some embodiments, a "merge mode" may refer to deriving the motion information from spatially or temporally neighboring blocks.

The motion compensation unit 902 may produce motion compensated blocks. Identifiers for interpolation filters to be used with sub-pixel precision may be included in the syntax elements.

The motion compensation unit 902 may use the interpolation filters as used by video encoder 800 during encoding of the video block to calculate interpolated values for sub-integer pixels of a reference block. The motion compensation unit 902 may determine the interpolation filters used by video encoder 800 according to the received syntax information and use the interpolation filters to produce predictive blocks.

The motion compensation unit 902 may use at least part of the syntax information to determine sizes of blocks used to encode frame (s) and/or slice (s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 903 may use intra prediction modes for example received in the bitstream to form a prediction block from spatially adjacent blocks. The inverse quantization unit 903 inverse quantizes, i.e., de-quantizes, the quantized video block coefficients provided in the bitstream and decoded by entropy decoding unit 901. Inverse transform unit 903 applies an inverse transform.

The reconstruction unit 906 may obtain the decoded blocks, e.g., by sum the residual blocks with the corresponding prediction blocks generated by motion compensation unit 802 or intra-prediction unit 903. If desired, a deblocking filter may also be applied to filter the decoded blocks in order to remove blockiness artifacts. The decoded video blocks are then stored in buffer 907, which provides reference blocks for subsequent motion compensation/intra predication and also produces decoded video for presentation on a display device.

Example Implementations

Some example embodiments of the subject matter described herein are listed below.

Proposal 1. A method for image processing, comprising:
obtaining an intermediate image from a first image, wherein the intermediate image has a higher resolution than the first image;
determining a smooth value associated with an image block in the intermediate image based on a gradient of a target pixel in the image block; and
generating a second image from the intermediate image based on the smooth value, wherein the second image has a higher resolution than the first image.

Proposal 2. The method of proposal 1, wherein generating the second image comprises:
generating the second image based on the image block without filtering in a case that the smooth value is greater than a threshold.

Proposal 3. The method of proposal 1, wherein generating the second image comprises:
generating the second image based on the image block with filtering in a case that the smooth value is less than or equal to a threshold.

Proposal 4. The method of proposal 3, wherein generating the second image from the intermediate image comprises:
selecting a target filter from a target group of trained filters;
filtering the image block based on the target filter to obtain a filtered image block; and
generating the second image based on the filtered image block.

Proposal 5. The method of proposal 4, wherein selecting a target filter from a group of trained filters, comprises:
determining a filter key associated with the image block based on a horizontal gradient and a vertical gradient of a pixel in the image block, wherein the filter key is irrelevant to a product of the horizontal gradient and the vertical gradient; and
selecting the target filter from the target group of trained filters based on the filter key, each of the target group of trained filters associated with a corresponding filter key.

Proposal 6. The method of proposal 5, wherein determining a filter key associated with the image block based on a horizontal gradient and a vertical gradient of a pixel in the image block comprise:
determining the filter key by the following functions:

$$S = \frac{0.99}{g_x + g_y + e^{-4}}$$

$$T = S \times g_x$$

$$M = g_{xy} \times S + 0.49$$

$$\text{key} = \lfloor \theta \times T \rfloor \times \mu + \lfloor M \times \mu \rfloor$$

wherein, $g_x$ is the horizontal gradient, $g_y$ is the vertical gradient, $g_{xy}=g_x \times g_y$, $\theta$ and $\mu$ are predefined parameters.

Proposal 7. The method of proposal 4, further comprising:
determining an up-scale ratio for the first image; and
selecting the target group of trained filters from multiple groups of trained filters, wherein the target group of trained filters are trained with a training up-scale ratio matching the determined up-scale ratio, and wherein each group of the multiple groups of trained filters comprises multiple trained filters.

Proposal 8. The method of proposal 7, wherein the up-scale ratio for the first image is K, wherein a group of the multiple groups of trained filters is trained with an up-scale ratio $k_i$, wherein i is an integer greater than 0 and less than N+1, wherein N denotes the number of the multiple groups, wherein the multiple groups of trained filters are sorted by the trained up-scale ratio $k_i$, ascending, and wherein the i-th group of trained filters is selected as the target group if:

$$\begin{cases} 0 < K < \dfrac{1}{k_i + a}, i = 1 \\ \dfrac{1}{k_i + a} \le K < \dfrac{1}{k_i - a}, 1 < i < N, \\ K \ge \dfrac{1}{k_i + q}, i = N \end{cases}$$

wherein a is a constant.

Proposal 9. The method of proposal 7, wherein each filter of the multiple trained filters is trained with natural images and screen content images, and a number of the natural images is less than a number of the screen content images.

Proposal 10. The method of proposal 7, wherein the up-scale ratio comprises a horizontal up-scale ratio and a vertical up-scale ratio different from the horizontal up-scale ratio, and wherein selecting the target group of trained filters from multiple groups of trained filters comprises:
selecting, from multiple groups of trained filters, a first group of trained filters based on the horizontal up-scale ratio, wherein each filter of the first group of filters is used for filtering in a horizontal direction; and
selecting, from the multiple groups of trained filters, a second group of trained filters based on the vertical up-scale ratio, wherein each filter of the second group of filters is used for filtering in a vertical direction.

Proposal 11. The method of proposal 3, wherein the image block is a first image block, and wherein generating the second image based on the image block with filtering comprises:
filtering the first image block to obtain a second image block;
blending the first image block and the second image block to obtain a third image block in a case that a difference between a pixel in the first image block and a corresponding pixel in the second image block is greater than a threshold;
generating the second image based on the third image block.

Proposal 12. The method of proposal 1, wherein the smooth value is derived based on a gradient of a target pixel in the image block, and wherein the target pixel comprises one or more pixels selected from a plurality of pixels of the image block.

Proposal 13. The method of proposal 1, wherein the first image is a first sub-image of a target image, the method further comprising:
generating a third image based on a second sub-image of the target image in parallel with generating the second image based on the first image, wherein the third image has a higher resolution than the second sub-image.

Proposal 14. The method of proposal 1, wherein the first image is a first frame, and the first frame is a reference frame of a second frame, the method further comprising:
obtaining a first flag from a bitstream, wherein the first flag indicates that an up-sampling process on the second frame is to be skipped;
determining the second image as an output frame of the second frame.

Proposal 15. The method of proposal 1, wherein the first image is a first sub-image, and the first sub-image is a reference sub-frame of a second sub-frame, the method further comprising:
obtaining a second flag from a bitstream, wherein the second flag indicates that an up-sampling process on the second sub-frame is to be skipped;
determining the second image as an output frame of the second sub-frame.

Proposal 16. The method of proposal 14, wherein the method further comprising:
determining the reference sub-image based on motion information of reuse information of the second sub-image, wherein the reuse information comprise at least one of: Motion Vector (MV), Block Vector (BV) or a reference frame of the second sub-image.

Proposal 17. The method of proposal 1, further comprising: encoding the first image into a bitstream of a video.

Proposal 18. The method of proposal 1, further comprising: decoding the first image from a bitstream of a video.

Proposal 19. The method of proposal 1, wherein the method further comprising:
determining mask information based on the smooth value, wherein the mask information at least indicating whether the image block is to be filtered.

Proposal 20. The method of proposal 19, wherein mask information indicating that the image block is not to be filtered in a case that the smooth value is greater than a first threshold.

Proposal 21. The method of proposal 19, wherein mask information indicating that the image block is to be filtered in a case that the smooth value is less than or equal to a second threshold.

Proposal 22. The method of proposal 10, wherein filtering the image block using the target filter comprises:
filtering the image block by using a first target filter selected from the first group of trained filters in a horizontal direction; and
filtering the filtered image block by using a second target filter selected from the second group of trained filters in a vertical direction.

Proposal 23. The method of proposal 4, wherein the target group of trained filters are trained using Singular Value Decomposition.

Proposal 24. The method of proposal 4, wherein gradients' angle is disregarded during training of the target group of trained filters.

Proposal 25. The method of proposal 4, wherein the target filter comprises at least one of:
a filer with a square shape,
a filter with a symmetric shape, or
a filter with an asymmetric shape.

Proposal 26. The method of proposal 25, wherein the filer with a square shape is a filer with 7×7 square or 11×11 square.

Proposal 27. The method of proposal 1, wherein the gradient of the target pixel is derived based on the target pixel and at least one of:
- a pixel which is horizontally adjacent with the target pixel,
- a pixel which is vertically adjacent with the target pixel, or
- a pixel which is diagonally adjacent with the target pixel.

Proposal 28. The method of proposal 1, wherein the gradient of the target pixel and a reference pixel adjacent with the target pixel, wherein the reference pixel is derived by padding boundary pixels of the intermediate image in a case that the reference pixel is out of the intermediate image.

Proposal 29. The method of proposal 1, wherein the intermediate image is derived from the first image using a bicubic interpolation algorithm, a lanczos interpolation algorithm, or a nearest-neighbor interpolation algorithm.

Proposal 30. The method of proposal 1, wherein the gradient of the target pixel is derived based on at least two of:
- a horizontal gradient, derived based on the target pixel and a pixel which is horizontally adjacent with the target pixel,
- a vertical gradient, derived based on the target pixel and a pixel which is vertically adjacent with the target pixel, or
- a diagonal gradient derived based on the target pixel and a pixel which is diagonally adjacent with the target pixel.

Proposal 31. The method of proposal 28, wherein the gradient of the target pixel is derived by using weighted average algorithm, and wherein weights in the weighted average algorithm can be same or different.

Proposal 32. An apparatus for processing image data comprising a processor and a non-transitory memory with instructions thereon, wherein the instructions upon execution by the processor, cause the processor to:
- obtain an intermediate image from a first image, wherein the intermediate image has a higher resolution than the first image;
- determine a smooth value associated with an image block in the intermediate image based on a gradient of a target pixel in the image block; and
- generate a second image from the intermediate image based on the smooth value, wherein the second image has a higher resolution than the first image.

Proposal 33. A non-transitory computer-readable storage medium storing instructions that cause a processor to:
- obtain an intermediate image from a first image, wherein the intermediate image has a higher resolution than the first image;
- determine a smooth value associated with an image block in the intermediate image based on a gradient of a target pixel in the image block; and
- generate a second image from the intermediate image based on the smooth value, wherein the second image has a higher resolution than the first image.

Proposal 34. A non-transitory computer-readable recording medium storing a bitstream of a video which is generated by a method performed by a video processing apparatus, wherein the method comprises:
- obtaining, for conversion between a first image of a video and a bitstream of the video, an intermediate image from the first image, wherein the intermediate image has a higher resolution than the first image;
- determining a smooth value associated with an image block in the intermediate image based on a gradient of a target pixel in the image block;
- generating a second image from the intermediate image based on the smooth value, wherein the second image has a higher resolution than the first image; and
- generating the bitstream from the first image.

Proposal 35. A method for image processing, comprising:
- obtaining, for conversion between a first image of a video and a bitstream of the video, an intermediate image from the first image, wherein the intermediate image has a higher resolution than the first image;
- determining a smooth value associated with an image block in the intermediate image based on a gradient of a target pixel in the image block; and
- generating a second image from the intermediate image based on the smooth value, wherein the second image has a higher resolution than the first image.

Proposal 36. The method of proposal 35, wherein the conversion includes encoding the first image into the bitstream.

Proposal 37. The method of proposal 35, wherein the conversion includes decoding the first image from the bitstream.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single implementation. Rather, various features described in a single implementation may also be implemented in multiple embodiments separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

To solve the above problems and some other problems not mentioned, methods as summarized below are disclosed. The inventions should be considered as examples to explain the general concepts and should not be interpreted in a narrow way. Furthermore, these inventions can be applied individually or combined in any manner.

In this invention, a method called simplified RAISR (S-RAISR) is proposed wherein a mask generation is introduced in the RAISR process to decide whether to apply filtering or not. Meanwhile, multiple modifications to each step in the RAISR process have been applied.

1) On the initial upsampling process
   a. Instead of using the bilinear algorithm, it is proposed to use the lanczos algorithm.
   b. Alternatively, bicubic algorithm is utilized in the initial upsampling process.
   c. Alternatively, the nearest-neighbor interpolation algorithm is utilized in the initial upsampling process.
2) On gradient computation
   a. Horizontal and/or vertical gradients for each video unit (e.g., per M×N sample/pixels wherein M and N are integers) are calculated in the gradient initialization process.
      i. Alternatively, furthermore, diagonal gradients (e.g., 45-degree and/or 135-degree) are calculated.
         a) In one example, the 45-degree gradient is defined as:
            Sum of the difference between current video unit and its corresponding right-top video unit and the difference between current video unit and its corresponding left-bottom video unit.
         b) In one example, the 135-degree gradient is defined as:
            Sum of the difference between current video unit and its corresponding left-top video unit and the difference between current video unit and its corresponding right-bottom video unit.
      ii. In one example, M and N are both equal to 1.
      iii. In one example, either M or N is greater than 1.
         a) Alternatively, furthermore, for each video unit, gradient information of each samples/pixels within the video unit may be calculated and used.
         b) Alternatively, furthermore, for each video unit, gradient information of selective K (K<M*N) samples/pixels within the video unit may be calculated and used.
         c) In one example, gradient information for each sample/pixel within the selective K samples/pixels (denoted by tempG) may be firstly calculated and the final gradient information for the video unit may be based on the calculated tempG, e.g., averaged sum of tempG.
      iv. In one example, the gradient information of samples which are out of picture boundary are calculated by padding the boundary samples.
   b. A MASK generation process is invoked which is based on the initialized gradients of each video unit.
      i. In one example, for each processing unit (e.g., X*Y sample/pixels), a mask value is calculated.
         a) In one example, the mask is defined as:
            1. The mask value is set to 1 when both of the diagonal gradients are less a threshold value T.
            2. The mask value is set to 1 when both of the horizontal and vertical gradients are less than a threshold value T.
            3. Otherwise, the mask value is set to 0.
         b) In one example, X=M, and Y=N.
   c. In one example, the gradients of each video units are further refined, such as using the average of gradient information directly.
      i. In one example, the average of gradients for each direction (e.g., hor/ver/diagonal) for all video units within a K*L sub-region is calculated and used as the refined gradient for all samples within the K*L sub-region.
   d. In above examples, at least one of M, N, X, Y, K, L and T may be pre-defined or adaptively changed (e.g., according to scaling factors/resolution/decoded information) or signaled.
3) On filter key selection
   a. Strength of refined/unrefined gradient is used to compute filter key.
      i. In one example, both of the horizontal and vertical gradient information are used to compute filter key. The formulation of filter key can be updated as:

$$S = \frac{0.99}{(g_x)^2 + (g_y)^2 + e^{-4}}$$

$$T = S \times (g_x)^2$$

$$key = \lfloor \theta \times T \rfloor \times \mu + \lfloor 0.49 \times \mu \rfloor$$

4) On enabling/disabling filtering
   a. Whether to skip filtering some pixels may be determined according to the MASK information.
5) On model training
   a. Learn the filters in a more effective way.
      i. In one example, Singular Value Decomposition is utilized to update each filter iteratively.
      ii. Alternatively, gradients' angle is disregarded according to characteristics of screen content images.
6) On multiple scale factor
   a. Several upscale ratios share one set of filters.
      i. In one example, totally M (e.g., M=10) scale models are trained/maintained to cover almost all commonly used scale ratios.
         a) In one example, the model trained for upscale ratio of 1/k (e.g., k=0.1) which is the greatest ratio in M is used by cases with upscale ratio in $$\left(0, \frac{1}{k+0.05}\right).$$

b) In one example, the model trained for upscale ratio of 1/p (e.g., p=0.9) that is the least ratio in M is used by cases with upscale ratio in $$\left[\frac{1}{p-0.05}, 1\right).$$

c) In one example, the model that trained for upscale ratio 1/q (e.g., q=0.5) will be used by case with upscale ratio in $$\left[\frac{1}{q-0.05}, \frac{1}{q+0.05}\right).$$

ii. In one example, the input image is scaled horizontally and vertically independently when the horizontal/vertical scale factors are different.
7) On parallel processing.
  i. In one example, the input image is divided into multiple non-overlapped slices, and each slice is processed individually without referencing any samples in any other slices.
  ii. Alternatively, the input image is divided into multiple non-overlapped regions, and each region is processed individually but referencing samples in other regions before being upscaled is allowed.
8) To solve the third problem, one or more of the following approaches are disclosed wherein the decoded information may be utilized in the upsampling process to determine filter information and/or on/off of filters:
  a. On decoded information
    i. In one example, the decoded information could be the reusage flag of copying previously reconstructed frame in the decoded bit streams.
    ii. In one example, the decoded information could be the reference frame information in the decoded bit streams.
    iii. In one example, the decoded information could be the block segmentation information in the decoded bit streams.
    iv. In one example, the decoded information could be the skip-mode flag information in IBC mode or inter mode in the decoded bit streams.
    v. In one example, the decoded information could be the MV or BV information in IBC mode or inter mode in the decoded bit streams.
  b. Usage of decoded information
    i. In one example, whole-frame level upsampling process may be skipped.
      a) In one example, the previously S-RAISR processed frame will be reused and the upsampling process of current frame will be skipped.
        a. Alternatively, furthermore, when the reusage flag of copying previously reconstructed frame for the current frame is equal to 1, the above method may be applied.
      b) In one example, the reused up-sampled frame is selected according to the corresponding reference frame information of current frame.
  c. Block-level decision of skipping upsampling
    i. In one example, the input frame could be segmented into blocks and each block may be adaptively determined whether to and/or how to apply upsampling process
      a) In one example, the determination may be according to the block segmentation information in the decoded bit streams.
      b) In one example, for a block, if it is determined to skip the upsampling process, the upscaled version of the block may be derived from previously S-RAISR processed blocks (in current frame or other frames).
      c) In one example, the previously S-RAISR processed block will be reused and the upsampling process of current block will be skipped when the skip-mode flag of current block is equal to 1.
      d) In one example, the reused upscaled block is selected according to the corresponding MV or BV information and reference frame information.
9) Filter support:
  a. 7×7 square
    i. In one example, the filter size of S-RAISR could be 7×7.
  b. 11×11 square
    i. In one example, the filter size of S-RAISR could be 11×11.
  c. Symmetric
  d. asymmetric
    i. In one example, the filter could be asymmetric shape as shown in the following figure.
10) On combine Lanczos/bilinear with RAISR
  a. The upscaled image could be blended with the initial upscaled image.
    i. In one example, smooth region defined by the smooth detection method (e.g., Census Transform) in the S-RAISR processed image could be blended with the lanczos/bilinear upscaled image.
11) On filtering
  a. In one example, filtering is performed in M×N samples/pixels basis, that is the same filter coefficients are applied to the M×N samples.
12) The proposed methods which are applied to RAISR/S-RAISR may be used in the decoding process, wherein the upscaled version may be utilized to predict other pictures to be decoded.
  a. In one example, a decoded frame may be firstly upscaled, and then utilized.
13) The proposed methods which are applied to RAISR/S-RAISR may be used in the decoding process, wherein the upscaled version of a sub-region within a frame may be utilized to predict other regions to be decoded.
  a. In one example, an indicator of a sub-region may be signaled.
    i. In one example, the sub-region may be defined as a CTB/CTU/a pre-defined size.

This embodiment describes an example of how to train a RAISR model for screen content images and how to speed up the RAISR testing process.
1) On Gradient Computation
  a. The horizontal gradient information of current video unit is calculated by the difference between current video unit and its corresponding rightside video unit. The vertical gradient information of current video unit is calculated by the different between current video unit and its corresponding downside video unit.
  b. To further speed up testing process of RAISR, we utilize the gradient information generated from gradient initialization process to build a MASK. The MAKS can help us to recognize the smooth and texture region of input image, especially for screen content images.

The MASK is used to guide the gradient refinement process, filter key computation process and filtering process.

Specifically, for a pixel located at position (i,j) named as $p_{ij}$ with initial horizontal gradient $g_x$ and vertical gradient $g_y$, we set the MASK value for $p_{ij}$ based on a threshold value T. If $g_x$ and $g_y$ are both smaller than the threshold T, we set the MASK value of $p_{ij}$ as 1, otherwise the MASK value of $p_{ij}$ is set to 0. When MASK value of current pixel is equal to 1, the corresponding gradient refinement, filter key computing and filtering process of current pixel will be skipped, which means the output pixel value of current pixel will be same with its input pixel value.

Furthermore, the MASK also can be generated for a patch with size of 2×2. If MASK value of pixel $p_{ij}$ is set to 1, the MASK value of surrounding pixels such as $p_{(i+1)j}$, $p_{i(j+1)}$ and $p_{(i+1)(j+1)}$ will also be set to 1 simultaneously and the MASK checking process for these surrounding pixels will be skipped. Similar with above-mentioned MASK usage, when MASK value of left top pixel of current 2×2 patch is equal to 1, the corresponding gradient refinement, filter key computing and filtering process for current 2×2 patch will be skipped. Output pixel value of these four pixel value will be same as themselves.

2) On Model Training

A simple way to slove above minimization problem is just let $A_q^T A_q h_q$ equal to $A_q^T b_q$ and utilize Orthogonal-triangular matrix decomposition to obtain the filter for each group. To generate more stable and accuratale filter, we utilize SVD decomposition to obtain the filter for each group and iteratively update the filter according to the residual. For each group, we define $Q_q = A_q^T A_q$ and $V_q = A_q^T b_q$. Let parameter λ decrease from 1 to $e^{-8}$ with step size of 0.1. The filter generating process can be formulated as $$\min_{h_q} \|Q_q h_q - V_q\|_2^2$$

For each iterative step, we let $$Q_q = Q_q + \lambda \times \begin{pmatrix} 1 & \cdots & 0 \\ \vdots & 1 & \vdots \\ 0 & \cdots & 1 \end{pmatrix}$$

Then we use the two-sided Jacobi SVD decomposition to solve above minimization problem and get the filter coefficients for group q.

3) On Parallel Processing.

To further reduce processing time of RAISR, we cut one input image into several slices and achieve parallel processing. For an input image with size of w×h, the number of slices is set according to the thread number t. In such strategy, the input image is divided into t slices denote by $[s_1, s_2, s_3 \ldots s_t]$. The width of each slice is equal to original image width w. For height of each slice, we first calculate the $h_{slice} = \lfloor h/t \rfloor$ and the height of $s_1$ to $s_{t-1}$ are set equal to $h_{slice}$. The height of last slice $s_t$ is calculated by $h - h_{slice} \times (t-1)$. These slices are processed simultaneously without any dependency.

What is claimed is:

1. A method for image processing, comprising:
   obtaining an intermediate image from a first image, wherein the intermediate image has a higher resolution than the first image;
   determining a smooth value associated with an image block in the intermediate image based on a gradient of a target pixel in the image block; and
   generating a second image from the intermediate image based on the smooth value, wherein the second image has a higher resolution than the first image,
   wherein generating the second image comprises:
      generating the second image based on the image block without filtering in a case that the smooth value is greater than a threshold; and
      generating the second image based on the image block with filtering in a case that the smooth value is less than or equal to the threshold;
   wherein generating the second image based on the image block with filtering comprises:
      determining a filter key associated with the image block based on a horizontal gradient and a vertical gradient of a pixel in the image block, wherein the filter key is irrelevant to a product of the horizontal gradient and the vertical gradient;
      selecting a target filter from a target group of trained filters based on the filter key, each of the target group of trained filters associated with a corresponding filter key;
      filtering the image block based on the target filter to obtain a filtered image block; and
      generating the second image based on the filtered image block.

2. The method of claim 1, further comprising:
   determining an up-scale ratio for the first image; and
   selecting the target group of trained filters from multiple groups of trained filters, wherein the target group of trained filters are trained with a training up-scale ratio matching the determined up-scale ratio, and wherein each group of the multiple groups of trained filters comprises multiple trained filters.

3. The method of claim 2, wherein each filter of the multiple trained filters is trained with natural images and screen content images, and a number of the natural images is less than a number of the screen content images.

4. The method of claim 2, wherein the up-scale ratio comprises a horizontal up-scale ratio and a vertical up-scale ratio different from the horizontal up-scale ratio, and wherein selecting the target group of trained filters from multiple groups of trained filters comprises:
   selecting, from multiple groups of trained filters, a first group of trained filters based on the horizontal up-scale ratio, wherein each filter of the first group of trained filters is used for filtering in a horizontal direction; and
   selecting, from the multiple groups of trained filters, a second group of trained filters based on the vertical up-scale ratio, wherein each filter of the second group of trained filters is used for filtering in a vertical direction.

5. The method of claim 1, wherein the image block is a first image block, and wherein generating the second image based on the filtered image block comprises:
   blending the first image block and the filtered image block to obtain a third image block in a case that a difference between a pixel in the first image block and a corresponding pixel in the filtered image block is greater than a threshold; and generating the second image based on the third image block.

6. The method of claim 1, wherein the smooth value is derived based on a gradient of a target pixel in the image block, and wherein the target pixel comprises one or more pixels selected from a plurality of pixels of the image block.

7. The method of claim 1, wherein the first image is a first sub-image of a target image, the method further comprising:
generating a third image based on a second sub-image of the target image in parallel with generating the second image based on the first image, wherein the third image has a higher resolution than the second sub-image.

8. The method of claim 1, wherein the first image is a first frame, and the first frame is a reference frame of a second frame, the method further comprising:
obtaining a first flag from a bitstream, wherein the first flag indicates that an up-sampling process on the second frame is to be skipped; and
determining the second image as an output frame of the second frame.

9. The method of claim 1, wherein the first image is a first sub-image, and the first sub-image is a reference sub-frame of a second sub-frame, the method further comprising:
obtaining a second flag from a bitstream, wherein the second flag indicates that an up-sampling process on the second sub-frame is to be skipped; and
determining the second image as an output frame of the second sub-frame.

10. The method of claim 9, further comprising:
determining the reference sub-image based on motion information of reuse information of the second sub-image, wherein the reuse information comprise at least one of: Motion Vector (MV), Block Vector (BV) or a reference frame of the second sub-image.

11. The method of claim 1, wherein the target filter comprises at least one of:
a filer with a square shape,
a filter with a symmetric shape, or
a filter with an asymmetric shape.

12. The method of claim 1, further comprising: encoding the first image into a bitstream of a video.

13. The method of claim 1, further comprising: decoding the first image from a bitstream of a video.

14. An apparatus for processing image data comprising a processor and a non-transitory memory with instructions thereon, wherein the instructions upon execution by the processor, cause the processor to:
obtain an intermediate image from a first image, wherein the intermediate image has a higher resolution than the first image;
determine a smooth value associated with an image block in the intermediate image based on a gradient of a target pixel in the image block; and
generate a second image from the intermediate image based on the smooth value, wherein the second image has a higher resolution than the first image,
wherein generating the second image comprises:
generating the second image based on the image block without filtering in a case that the smooth value is greater than a threshold; and
generating the second image based on the image block with filtering in a case that the smooth value is less than or equal to the threshold;
wherein generating the second image based on the image block with filtering comprises:
determining a filter key associated with the image block based on a horizontal gradient and a vertical gradient of a pixel in the image block, wherein the filter key is irrelevant to a product of the horizontal gradient and the vertical gradient;
selecting a target filter from a target group of trained filters based on the filter key, each of the target group of trained filters associated with a corresponding filter key;
filtering the image block based on the target filter to obtain a filtered image block; and
generating the second image based on the filtered image block.

15. A non-transitory computer-readable storage medium storing instructions that cause a processor to:
obtain an intermediate image from a first image, wherein the intermediate image has a higher resolution than the first image;
determine a smooth value associated with an image block in the intermediate image based on a gradient of a target pixel in the image block; and
generate a second image from the intermediate image based on the smooth value, wherein the second image has a higher resolution than the first image,
wherein generating the second image comprises:
generating the second image based on the image block without filtering in a case that the smooth value is greater than a threshold; and
generating the second image based on the image block with filtering in a case that the smooth value is less than or equal to the threshold;
wherein generating the second image based on the image block with filtering comprises:
determining a filter key associated with the image block based on a horizontal gradient and a vertical gradient of a pixel in the image block, wherein the filter key is irrelevant to a product of the horizontal gradient and the vertical gradient;
selecting a target filter from a target group of trained filters based on the filter key, each of the target group of trained filters associated with a corresponding filter key;
filtering the image block based on the target filter to obtain a filtered image block; and
generating the second image based on the filtered image block.

16. A non-transitory computer-readable recording medium storing a bitstream of a video which is generated by a method performed by a video processing apparatus, wherein the method comprises:
obtaining, for conversion between a first image of a video and a bitstream of the video, an intermediate image from the first image, wherein the intermediate image has a higher resolution than the first image;
determining a smooth value associated with an image block in the intermediate image based on a gradient of a target pixel in the image block;
generating a second image from the intermediate image based on the smooth value, wherein the second image has a higher resolution than the first image; and
generating the bitstream from the first image,
wherein generating the second image comprises:
generating the second image based on the image block without filtering in a case that the smooth value is greater than a threshold; and
generating the second image based on the image block with filtering in a case that the smooth value is less than or equal to the threshold;

wherein generating the second image based on the image block with filtering comprises:
- determining a filter key associated with the image block based on a horizontal gradient and a vertical gradient of a pixel in the image block, wherein the filter key is irrelevant to a product of the horizontal gradient and the vertical gradient;
- selecting a target filter from a target group of trained filters based on the filter key, each of the target group of trained filters associated with a corresponding filter key;
- filtering the image block based on the target filter to obtain a filtered image block; and
- generating the second image based on the filtered image block.

* * * * *